(12) United States Patent
Jung et al.

(10) Patent No.: US 9,990,125 B2
(45) Date of Patent: Jun. 5, 2018

(54) MOBILE TERMINAL AND METHOD OF CONTROLLING THE SAME

(71) Applicant: LG ELECTRONICS INC., Seoul (KR)

(72) Inventors: Egun Jung, Seoul (KR); Hongseok Choi, Seoul (KR); Haein Lee, Seoul (KR); Eun Kwon, Seoul (KR); Yeongnam Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 252 days.

(21) Appl. No.: 14/532,825

(22) Filed: Nov. 4, 2014

(65) Prior Publication Data

US 2015/0143238 A1 May 21, 2015

(30) Foreign Application Priority Data

Nov. 15, 2013 (KR) .................. 10-2013-0139290
Jun. 9, 2014 (KR) .................. 10-2014-0069547

(51) Int. Cl.
*G06F 3/0488* (2013.01)
*G06F 3/0481* (2013.01)
(Continued)

(52) U.S. Cl.
CPC ........ *G06F 3/0488* (2013.01); *G06F 3/03547* (2013.01); *G06F 3/0481* (2013.01); *G06F 3/0482* (2013.01); *G06F 3/04817* (2013.01); *G06F 3/04847* (2013.01); *G06F 3/04883* (2013.01); *G06F 9/4446* (2013.01);
(Continued)

(58) Field of Classification Search
CPC ...... G06F 3/048; G06F 3/0481; G06F 3/0482; G06F 3/0484; G06F 3/0485; G06F 3/0487; G06F 3/0488; G06F 3/04486; G06F 3/04886
See application file for complete search history.

(56) References Cited

U.S. PATENT DOCUMENTS 7,782,363 B2 * 8/2010 Ortiz ...................... H04N 5/232
  348/157
8,005,973 B2 * 8/2011 Collet ...................... H04N 5/76
  709/203

(Continued)

OTHER PUBLICATIONS

Unity online forum posts, downloaded from http://answers.unity3d.com/questions/23212/change-camera-position-with-minimap.html, published Jul. 24, 2010.*

(Continued)

*Primary Examiner* — Jennifer To
*Assistant Examiner* — Eric Yoon
(74) *Attorney, Agent, or Firm* — Lee, Hong, Degerman, Kang & Waimey

(57) ABSTRACT

The present disclosure may provide a mobile terminal including a body having a front surface, a rear surface and a lateral surface thereof, a display unit disposed on the front surface to display first screen information, a lateral touch sensing unit formed on the lateral surface adjacent to both edges of the display unit to receive a user's consecutive touch input, and a controller configured to control the display unit to display second screen information in one region on the display unit corresponding to a touch range of the consecutive touch input.

11 Claims, 41 Drawing Sheets

(51) Int. Cl.
*G06F 3/0354* (2013.01)
*G06F 3/0482* (2013.01)
*G06F 9/44* (2018.01)
*G06F 3/0484* (2013.01)

(52) U.S. Cl.
CPC .. *G06F 3/04886* (2013.01); *G06F 2203/0339* (2013.01); *G06F 2203/04803* (2013.01)

(56) References Cited

U.S. PATENT DOCUMENTS

| | | | |
|---|---|---|---|
| 2006/0197750 A1 | 9/2006 | Kerr et al. | |
| 2009/0113296 A1* | 4/2009 | Lacy | G01C 21/3667 715/700 |
| 2011/0175930 A1* | 7/2011 | Hwang | G06F 3/0481 345/629 |
| 2012/0081310 A1* | 4/2012 | Schrock | G06F 1/1616 345/173 |
| 2012/0131519 A1* | 5/2012 | Jitkoff | G06F 3/0481 715/863 |
| 2012/0218206 A1 | 8/2012 | Sato et al. | |
| 2012/0218207 A1 | 8/2012 | Sato et al. | |
| 2012/0218208 A1 | 8/2012 | Sato et al. | |
| 2013/0002524 A1 | 1/2013 | Sirpal et al. | |
| 2013/0076796 A1 | 3/2013 | Hayashi | |
| 2013/0120447 A1 | 5/2013 | Kim et al. | |
| 2013/0187861 A1* | 7/2013 | Lavallee | G06F 9/543 345/173 |
| 2013/0246970 A1* | 9/2013 | Helle | G06F 3/0482 715/822 |
| 2014/0176479 A1* | 6/2014 | Wardenaar | G11B 27/34 345/173 |
| 2014/0282208 A1* | 9/2014 | Chaudhri | G06F 3/04883 715/779 |
| 2015/0015511 A1* | 1/2015 | Kwak | G06F 3/0416 345/173 |

OTHER PUBLICATIONS

U.S. Appl. No. 61/834,036 dated Jul. 11, 2013.*
D. Howley, How to Use Split Screen Mode in Windows 8.1, published on Jun. 26, 2013.*
YouTube video, WinBeta, "How to use the Snap feature in Windows 8, have two apps side by side," published Mar. 10, 2012, downloaded from https://www.youtube.com/watch?v=DS9kPoJ5xvA.*
European Patent Office Application Serial No. 14192840.8, Search Report dated Jun. 22, 2015, 16 pages.
European Patent Office Application Serial No. 14192840.8, Search Report dated Mar. 20, 2015, 6 pages.
European Patent Office Application Serial No. 14192840.8, Office Action dated Aug. 28, 2017, 11 pages.

* cited by examiner

MOBILE TERMINAL AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Application Nos. 10-2013-0139290, filed on Nov. 15, 2013, and 10-2014-0069547, filed on Jun. 9, 2014, the contents of which are hereby incorporated by reference herein in their entirety.

BACKGROUND OF THE INVENTION

1. Field of the Invention

The present disclosure relates to a mobile terminal including a lateral touch sensing unit configured to receive a touch input for displaying visual information thereof.

Furthermore, the present disclosure relates to a mobile terminal including a display unit configured to receive a touch input for displaying visual information thereof.

2. Description of the Related Art

Mobile terminal is a portable electronic device having at least one of a voice and video communication function, an information input and output function, a data storage function, and the like.

As it becomes multifunctional, the mobile terminal can be allowed to capture still images or moving images, play music or video files, play games, receive broadcast and the like, so as to be implemented as an integrated multimedia player.

For the design and functional modifications of the terminal, studies on modifying or extending a structure to which a user's control command is applied have been carried out. In recent years, structures in which a display area is extended on the mobile terminal have been developed.

SUMMARY OF THE INVENTION

Accordingly, the technical task of the present disclosure is to propose a control method for applying a control command to a touch sensing unit formed on a lateral surface of a mobile terminal to control the mobile terminal.

In order to accomplish the foregoing task of the present disclosure, there is provided a mobile terminal, including a body having a front surface, a rear surface and a lateral surface thereof, a display unit disposed on the front surface to display first screen information, a lateral touch sensing unit formed on the lateral surface adjacent to both edges of the display unit to receive a user's consecutive touch inputs, and a controller configured to control the display unit to display second screen information in one region on the display unit corresponding to a touch range of the consecutive touch input.

According to an example associated with the present disclosure, the first and the second screen information may correspond to the execution screens of a first and a second application which are distinguished from each other.

According to an example associated with the present disclosure, the first and the second application may be being executed, and have been sequentially activated.

According to an example associated with the present disclosure, the display unit may display the first and the second screen information in separate regions on the display unit, and the controller may control the first application or the second application based on a touch input applied to the first screen information or second screen information.

According to an example associated with the present disclosure, the controller may control the display unit to display an icon of a recommended application associated with the first screen information when a first application is initially or finally activated among the applications being executed.

According to an example associated with the present disclosure, the controller may electively displays screen information displayed in a larger region between the first and the second screen information on the display unit when a touch input applied to the lateral touch sensing unit is released.

According to an example associated with the present disclosure, the first screen information may include at least one content, and the second screen information may be formed with visual information associated with content selected from the contents.

According to an example associated with the present disclosure, the controller may select content displayed in one region on the display unit corresponding to the touch range among a plurality of contents contained in the first screen information.

According to an example associated with the present disclosure, the visual information may correspond to a menu image for receiving a touch input to edit the content.

According to an example associated with the present disclosure, the visual information may correspond to a menu image for receiving a touch input to execute an application associated with the content.

According to an example associated with the present disclosure, the visual information may correspond to lower information associated with the content, and the controller may control the display unit to display some of the plurality of lower information in correspondence to the touch range.

According to an example associated with the present disclosure, the first screen information may correspond to a home screen page containing at least one icon corresponding to an application, and the controller may control the display unit to select at least one icon based on the touch range, and display lower information associated with the application of the selected icon.

According to an example associated with the present disclosure, the touch sensing unit may include a display unit configured to display an image, and the controller may display a notification image in one region of the touch sensing unit for receiving a touch input to display the second screen information.

According to an example associated with the present disclosure, when the first screen information contains a plurality of contents, and the second screen information is visual information associated with one content, the notification image may be displayed in one region on the lateral touch sensing unit adjacent to the content.

In order to accomplish the foregoing task of the present disclosure, there is provided a method of controlling a mobile terminal according to another embodiment disclosed in the present disclosure, and the method may include displaying first screen information on the display unit, sensing a consecutive touch input applied to a touch sensing unit connected to both lateral surfaces of the display unit, and displaying second screen information in one region on the display unit corresponding to a touch range due to the consecutive touch input.

According to an example associated with the present disclosure, the method may further include storing a sequence in which a plurality of applications being executed are activated, wherein the second screen information corresponds to one of the execution screens of the applications selected based on the sequence.

Still another technical task of the present disclosure is to propose a control method of applying a control command to a display unit formed on a lateral surface of a terminal to control a mobile terminal.

Yet still another technical task of the present disclosure is to display screen information having at least two or more display directions at the same time on the display unit.

In order to accomplish the foregoing task of the present disclosure, there is provided a mobile terminal, including a body having a front surface and a lateral surface thereof, a display unit comprising a first region disposed on the front surface of the body and a second region connected to the first region and disposed on the lateral surface, and a controller configured to display information associated with the screen information as screen information having a direction different from the displayed direction of the screen information in at least part of the first region when a preset type of touch is sensed on the second region in a state that screen information associated with a function being executed by the terminal is displayed in the first region, wherein the screen information having the different direction is displayed in at least part of the first region corresponding to the preset type of touch on the second region.

According to an embodiment, when the screen information have a first display direction, the screen information having the different direction may be screen information to be displayed in the first region when the screen information is displayed in a second display direction different from the first display direction.

According to an embodiment, the controller may display a region containing the same information as the screen information having the first display direction in a visually distinguished manner among the screen information having the second display direction.

According to an embodiment, the controller may control the display unit to display the screen information having the first display direction along with the screen information having the second display direction.

According to an embodiment, when a touch is applied to any one position of a region displayed with the screen information having the second display direction, the controller may scroll the screen information having the first display direction such that screen information corresponding to the any one position of the screen information having the first display direction moves to the center of the first region.

According to an embodiment, the second region may include a first sub-region disposed on either one of both lateral surfaces of the body and a second sub-region disposed on the other lateral surface, and when touches applied to the first and the second sub-region at the same time are sensed, the controller may display information associated with the screen information to have a different direction from the display direction of the screen information in a region corresponding to a region of the first region to which the drag is applied.

According to an embodiment, when a touch with respect to at least two regions is sensed on either one lateral surface of the second region provided on the both lateral surfaces, the controller may display information having the different direction in a region corresponding to a region in which the touch is sensed.

According to an embodiment, the controller may determine a direction in which information associated with the screen information is displayed according to a direction to which the preset type of touch is applied.

According to an embodiment, the second region may include a first sub-region disposed on either one of both lateral surfaces of the body and a second sub-region disposed on the other lateral surface, and the controller may determine a location at which information associated with the screen information is displayed based on drag inputs being sensed in different directions with respect to the first and the second sub-region, respectively.

According to an embodiment, screen information displayed in the first region may maintain its display location independently from information associated with the screen information being displayed in at least part of the first region.

According to an embodiment, the mobile terminal may further include at least two camera units having different capture directions, wherein when a preset type of touch is sensed in the second region in a state that an image received from either one of the at least one camera units is displayed on the display unit, the controller activates a camera unit having a different capture direction from that of the other one, and displays an image received from the camera unit having the different capture direction on at least part of the display unit.

According to an embodiment, at least two images received from the camera units having different capture directions from each other may be displayed at the same time on the display unit, and the controller may capture either one of the at least two images having different capture directions based on a user's request.

According to an embodiment, the controller may analyze screen information displayed in the first region, and determine at least part of the screen information displayed in a different direction from a current display direction when a preset type of touch is sensed in the second region.

According to an embodiment, the controller may no longer display information associated with the screen information in response to a touch being applied in an opposite direction to that of the preset type of touch in a state that the screen information having different display directions and information associated with the screen information are displayed at the same time in the first region.

A method of controlling a mobile terminal having a display unit on a front surface and a lateral surface thereof may include sensing a preset type of touch with respect to a second region disposed on the lateral surface in a state that screen information associated with a function being executed in a terminal is displayed in a first region disposed on the front surface, and displaying information associated with screen information displayed in the first region to have a different direction from the displayed direction of the screen information in at least part of the first region in response to the preset type of touch, wherein the display location of the information having the different direction is determined according to a direction to which a preset type of touch with respect to the second region is applied.

According to an embodiment, the information to be displayed in a different direction may be displayed in a region corresponding to a region of the first region to which the preset type of touch is applied.

According to an embodiment, when the screen information has a first display direction, the information having the different direction may be information to be displayed in the first region when the screen information is displayed in a second display direction different from the first display direction.

According to an embodiment, a region containing the same information as the screen information having the first display direction among the information having the second display direction may be displayed in a visually distinguished manner from other information.

According to an embodiment, the screen information having the first display direction and the information having the second display direction may be displayed at the same time.

According to an embodiment, the information having the second display direction may be displayed to be overlapped with at least part of the screen information displayed in the first display direction.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1A:
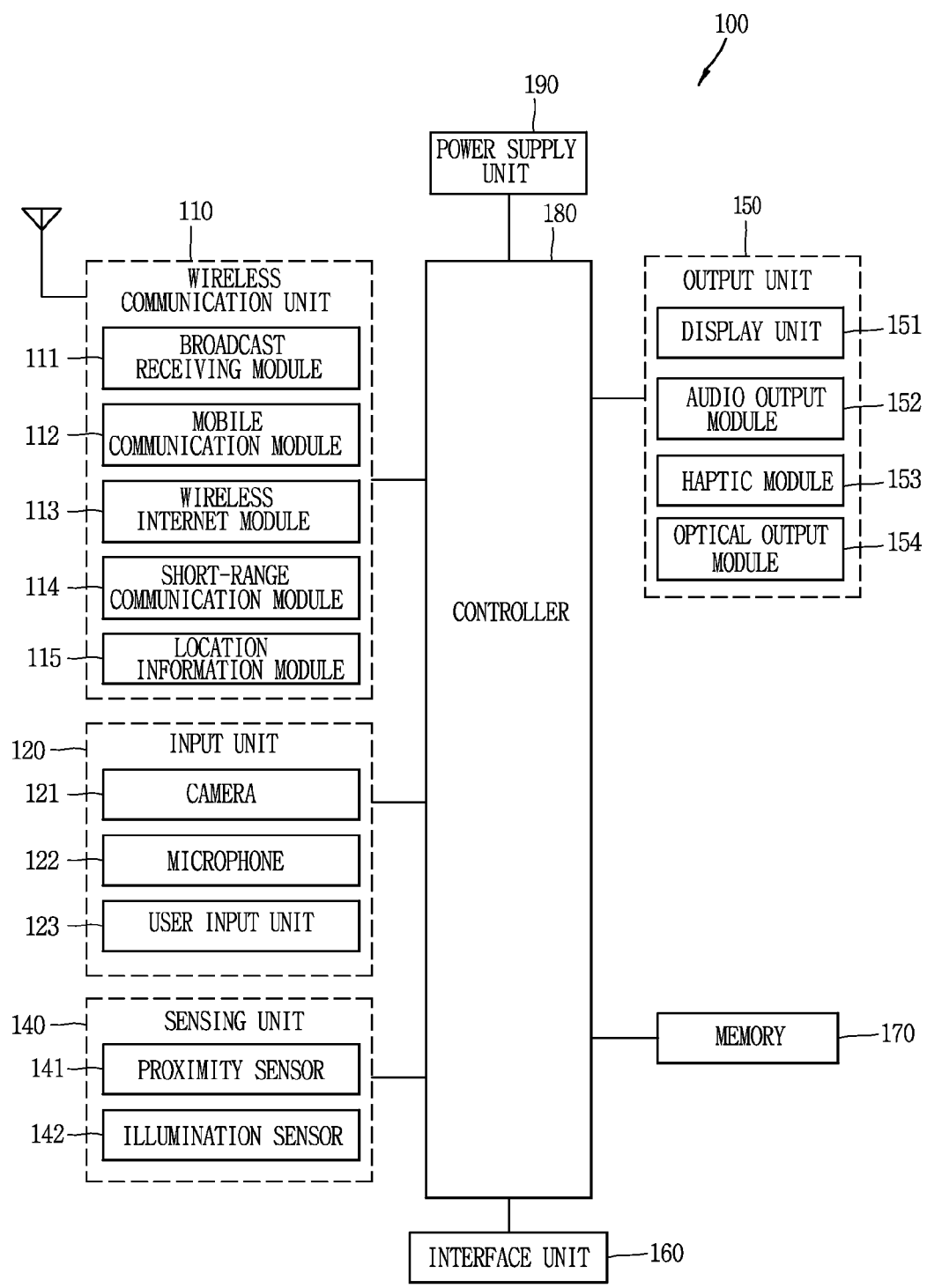
FIG. 1A is a block diagram illustrating a mobile terminal associated with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
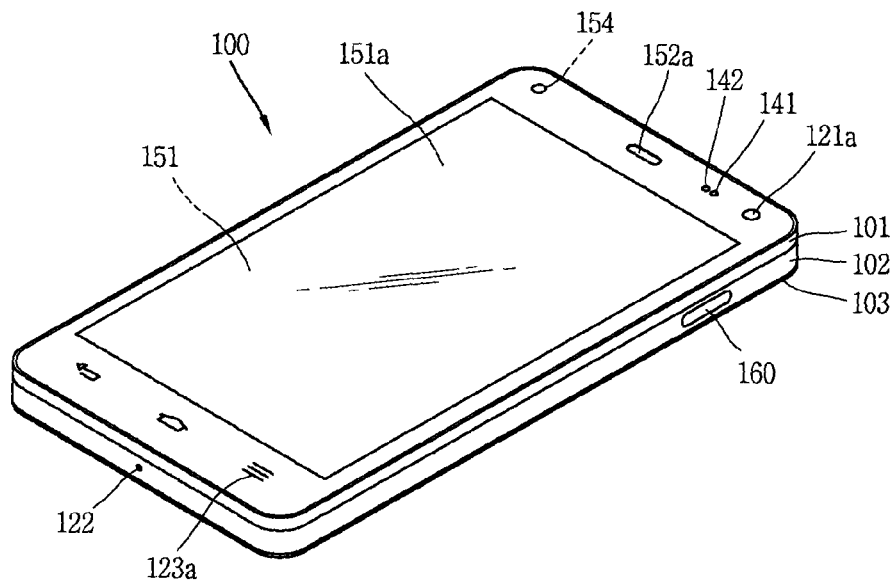
FIGS. 1B and 1C conceptual views in which an example of a mobile terminal associated with the present disclosure is seen from different directions.
Figure 1C:
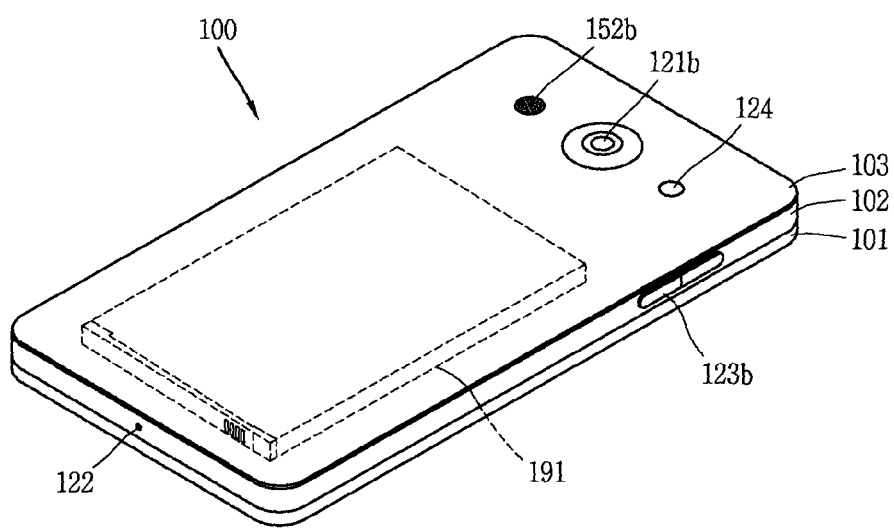

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, for the sake of convenience of explanation, the description disclosed herein will be limited to CDMA.

However, it is apparent that the present invention may be also applicable to all communication systems including a CDMA wireless communication system.

Figure 2A:
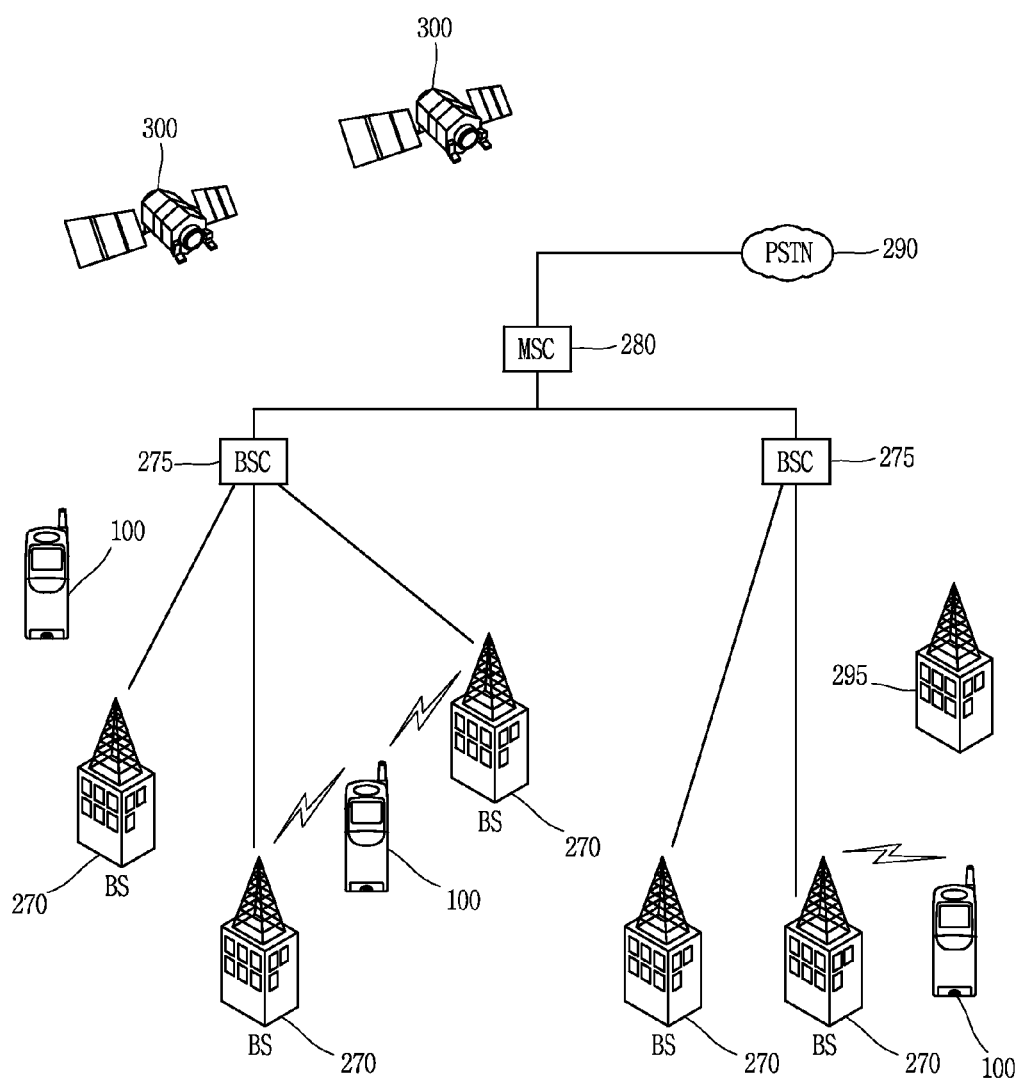
FIGS. 2A and 2B are conceptual views illustrating a communication system in which a mobile terminal according to the present disclosure is operable.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this case, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the mobile terminals 100 being operated within the system. The broadcast receiving module 111 as illustrated in FIG. 1A may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of mobile terminals 100. Though two satellites are illustrated in FIG. 2A, location information may be obtained with a greater or fewer number of satellites. The location information module 115 as illustrated in FIG. 1A may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various mobile terminals 100. At this time, the mobile terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 520 for transmitting and receiving to and from the WiFi module.

The WiFi positioning system 300 may include a WiFi location determination server 510, a mobile terminal 100, a wireless access point (AP) 520 connected to the mobile terminal 100, and a database 530 stored with any wireless AP information.

The WiFi location determination server 510 extracts the information of the wireless AP 520 connected to the mobile terminal 100 based on a location information request message (or signal) of the mobile terminal 100. The information of the wireless AP 520 may be transmitted to the WiFi location determination server 510 through the mobile terminal 100 or transmitted to the WiFi location determination server 510 from the wireless AP 520.

The information of the wireless AP extracted based on the location information request message of the mobile terminal 100 may be at least one of MAC address, SSID, RSSI, channel information, privacy, network type, signal strength and noise strength.

The WiFi location determination server 510 receives the information of the wireless AP 520 connected to the mobile terminal 100 as described above, and compares the received wireless AP 520 information with information contained in the pre-established database 530 to extract (or analyze) the location information of the mobile terminal 100.

Figure 2B:
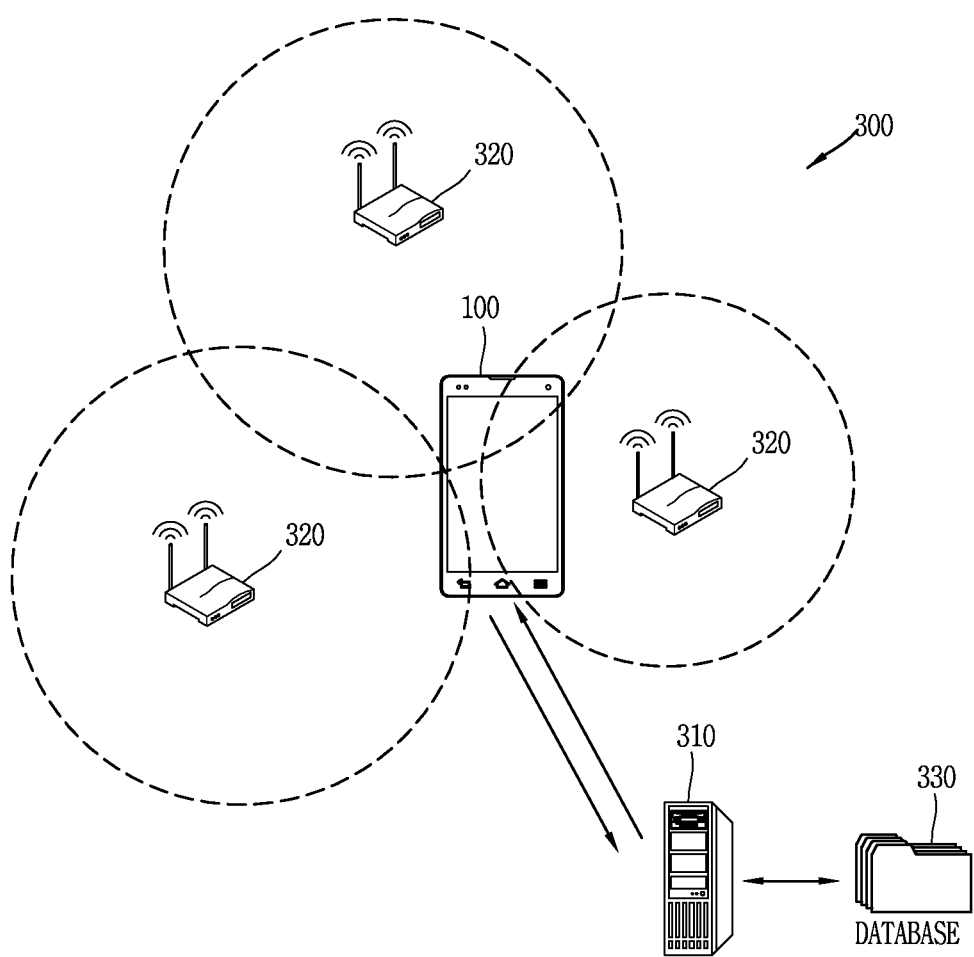

On the other hand, referring to FIG. 2B, as an example, the wireless AP connected to the mobile terminal 100 is illustrated as a first, a second, and a third wireless AP 520. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 530 stored with any wireless AP information in more detail, various information of any wireless APs disposed at different locations may be stored in the database 530.

The information of any wireless APs stored in the database 530 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 530, and thus the WiFi location determination server 510 may retrieve wireless AP information corresponding to the information of the wireless AP 520 connected to the mobile terminal 100 from the database 530 to extract the location information matched to the searched wireless AP, thereby extracting the location information of the mobile terminal 100.

Hereinafter, a communication system which is operable with the mobile terminal 100 according to the present disclosure will be described.

FIGS. 2A and 2B are conceptual views of a communication system operable with a mobile terminal in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminals 100 operating within the system. The broadcast receiving module 111 (FIG. 1A) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminals 100. Two satellites are depicted in FIG. 2A, but it is understood that useful position information may be obtained with greater or fewer satellites than two satellites. The GPS module 115 (FIG. 1A) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Figure 3A:
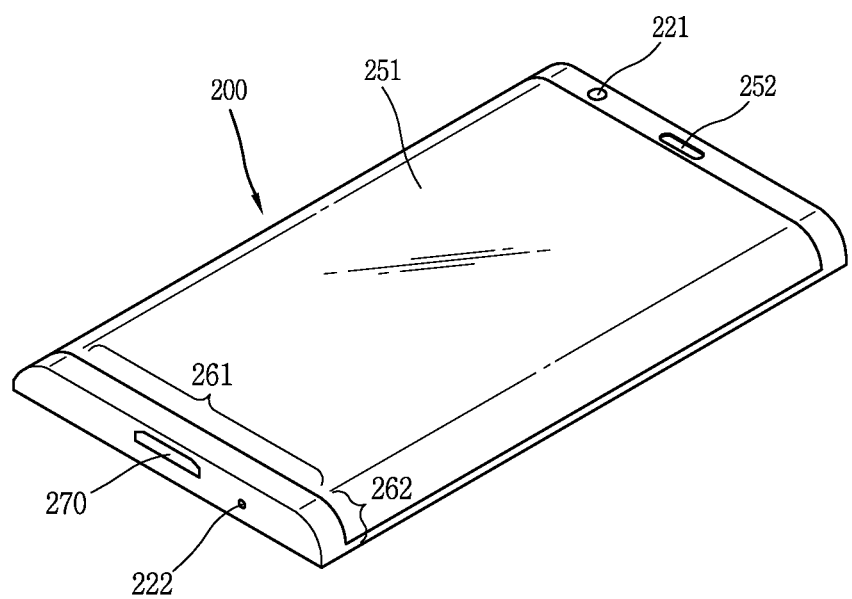
FIGS. 3A and 3B are conceptual views illustrating a mobile terminal having a lateral display unit.
Figure 3B:
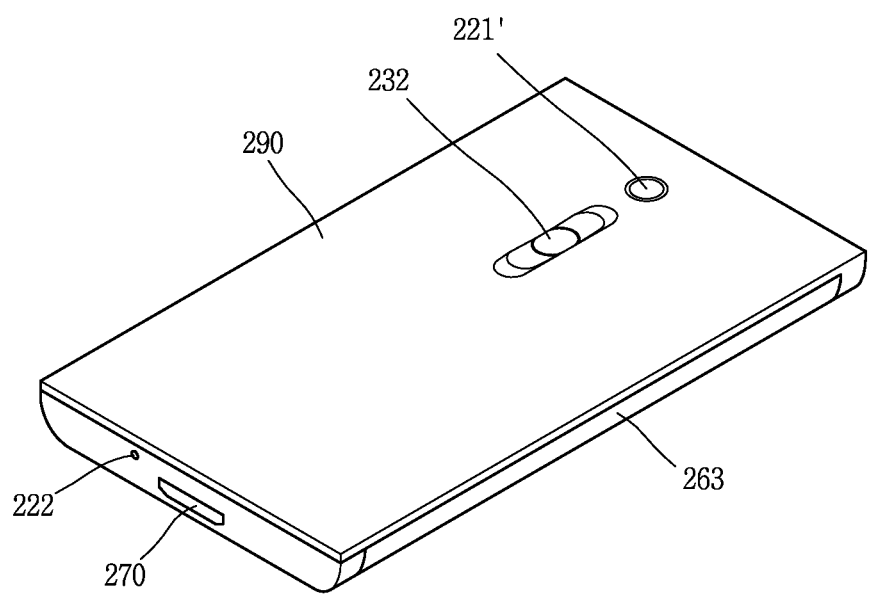

On the other hand, a mobile terminal according to the present disclosure may have various design forms. Hereinafter, a mobile terminal having a lateral display unit and a user interface using the same will be described as one of the structural changes and improvements. FIG. 3A is a front perspective view illustrating another example of a mobile terminal associated with the present disclosure, and FIG. 3B is a rear perspective view of a mobile terminal illustrated in FIG. 3A.

A mobile terminal 200 disclosed herein has a portable phone body in a bar shape. However, the present disclosure may not be necessarily limited to this, and may be also applicable to various structures of terminals such as a slide type, a folder type, a swing type, a swivel type, and the like, in which two and more bodies are combined with each other in a relatively movable manner.

The body includes a case (casing, housing, cover, etc.) forming an appearance of the terminal. In this embodiment, the case may be divided into a front case 201 and a rear case 202. Various electronic components may be incorporated in a space formed between the front case 201 and the rear case 202. At least one middle case may be additionally disposed between the front case 201 and the rear case 202.

The cases may be formed by injection-molding a synthetic resin or may be also formed of a metal material such as stainless steel (STS), titanium (Ti), or the like.

A display unit 251, an audio output module 252, a camera module 221, and the like may be disposed on the terminal body, mainly on the front case 201.

The display unit 251 occupies most of a main surface of the front case 101. In other words, the display unit is disposed on a front surface of the terminal, and formed to display visual information. The display unit 251 according to the present disclosure may be formed on a front surface of the terminal as well as in a form extended to another surface of the terminal. More specifically, the display unit 251 may include a first region 261 disposed on the front surface, and a second region 262, 263 extended from the first region 261 and disposed on a lateral surface of the body. Here, the lateral surface may be a surface which is seen by the user when a mobile terminal is seen from the lateral surface (or side).

On the other hand, at least part of the second region 262, 263 may be disposed on a front surface thereof. For example, the second region 262, 263 may be formed over a lateral surface and a front surface of the terminal. Here, whether or not the second region 262, 263 is seen from the front surface is determined according to a structure in which the first and the second region 261, 262, 263 are formed on the display unit 251.

For example, a window disposed on an upper surface of the display unit 251 is formed in a shape in which both lateral surfaces are bent down, and through this, the appearance of a front surface and a lateral surface of the body is formed by the window. Accordingly, the first region 261 and second region 262, 263 may be connected to each other in a shape having no physical interface. In this case, the display unit 251 is formed in a bent shape, and may include display elements integrated to correspond to the window.

For another example, the display unit 251 may be a flexible display unit. The flexible display may include a flexible, bendable, twistable, foldable and rollable display. Here, the flexible display unit may include both typical flexible displays and electronic paper.

Here, typical flexible display may be a light and non-fragile rigid display fabricated on a thin and flexible substrate that can be warped, bent, folded or rolled like a paper sheet while maintaining the display characteristics of a flat display in the related art.

Furthermore, electronic paper as a display technology to which a typical characteristic of ink is applied may be different from that of a typical flat panel display in which reflective light is used. Electronic paper may change a drawing or text using twist balls or electrophoresis using capsules.

In this manner, it may be possible to configure a terminal body having a form in which both lateral surfaces of the display unit is warped by flexible material properties.

On the other hand, a form in which a flexible display unit is extended to a front surface and both lateral surfaces thereof has been described in the above, but the present disclosure may be also configured with a form in which three independent display units are disposed on a front surface and both lateral surfaces thereof. For example, a front display unit 261 and a lateral display unit 262, 263 are independent display units, respectively, and may be configured with a form in which they are disposed in an adjacent manner.

The audio output unit 252 and a camera module 221 may be disposed in a region adjacent to one of both end portions of the display unit 251, and a front input unit (not shown) and a microphone 222 may be disposed in a region adjacent to the other end portion.

The front input unit as an example of the user input unit 230 (refer to FIG. 1A) may include a plurality of manipulating units. The manipulating units may be commonly referred to as a manipulating portion, and any method may be employed if it is a tactile manner allowing the user to perform manipulation with a tactile feeling.

Furthermore, the display unit 251 may form a touch screen along with a touch sensor, and in this case, the touch screen may be a user input unit. Through this, it may be possible to have a configuration with no front input unit on a front surface of the terminal. In this case, a mobile terminal may be configured to enable input manipulation to the terminal body only through the display unit 251 and a rear input unit 232 which will be described later.

Referring to FIG. 3B, a camera module 221' may be additionally mounted on a rear surface of the terminal body, namely, the rear case 202. The camera module 221' has an image capturing direction, which is substantially opposite to the direction of the camera 221 (refer to FIG. 3A), and may have a different number of pixels from that of the camera module.

For example, it is preferable that the camera module 221 has a relatively small number of pixels enough not to cause a difficulty when the user captures his or her own face and immediately sends it to the other party during a video call or the like, and the camera module 221' has a relatively large number of pixels since the user often captures a general object but does not sends it immediately. The camera modules 221, 221' may be provided in the terminal body in a rotatable and popupable manner.

A flash and a mirror may be additionally disposed adjacent to the camera module 221'. The flash illuminates light toward an subject when capturing the subject with the camera module 221'. The mirror allows the user to look at his or her own face, or the like, in a reflected way when capturing himself or herself (in a self-portrait mode) by using the camera module 221'.

An audio output unit (not shown) may be additionally disposed on a rear surface of the terminal body. The audio output unit on a rear surface thereof together with the audio output unit 252 (refer to FIG. 3A) on a front surface thereof can implement a stereo function, and may be also used to implement a speaker phone mode during a phone call.

In other words, a second audio output unit configured with a speaker on a rear surface of the terminal may be formed along with the audio output unit 252 (first audio output unit) configured with a receiver on a front surface thereof.

A power supply unit 290 for supplying power to the portable terminal 200 may be mounted on the terminal body. The power supply unit 290 may be configured to be incorporated in the terminal body, or directly detachable from the outside of the terminal body.

According to the drawing, a rear input unit 232 may be disposed on a rear surface of the terminal body. The rear input unit 232 may be located at a lower portion of the camera module 221', for example.

The rear input unit 232 may be manipulated to receive a command for controlling the operation of the mobile terminal 200, and the received content may be set in various ways. For example, it may be possible to receive a command such as power on/off, start, end, scroll or the like, or a command such as volume adjustment output from the audio output unit 252, switching to a touch recognition mode of the display unit 251, or the like. However, the present disclosure may not be necessarily limited to this, and the terminal may include only either one or both of the front input unit and rear input unit 232.

On the other hand, as described above, the controller 180 (refer to FIG. 1A) may control the function of the terminal using a display unit disposed on a lateral surface of the terminal.

Hereinafter, a method of controlling the function of the terminal using display units disposed on both lateral surfaces thereof will be described in more detail with reference to the accompanying drawings.

For the sake of convenience of explanation, the second region 262 denotes a display region disposed at a left side of both lateral surfaces based on the front surface, and the third region 263 denotes a display region disposed at a right side of both lateral surfaces based on the front surface. Furthermore, the first region 261 denotes a display (front display) disposed on the front surface.

Furthermore, on the contrary, though it is illustrated that the display unit 251 according to the present disclosure includes display regions at both the left and the right sides thereof, the display unit 251 may further include a lateral display unit only at either one of the left and the right sides thereof based on the first region 261. However, according to the present disclosure, for the sake of convenience of explanation, the display unit 251 including display regions (or display units) at a front surface, a left and a right sides thereof, respectively, will be described as an example.

Moreover, according to the present disclosure, a front display unit (or first region) will be described using reference numeral "261 or 151a", and a lateral display unit (or second region) will be described using reference numeral "151b", "262" or "263". And, the lateral display unit is also called "touch sensing unit".

Moreover, the content that can be applicable to both the front and lateral display unit will be described as a "display unit 251 or 151" instead of reference numerals indicating the front and lateral display units, regardless of distinguishing the front and lateral display unit.

Hereinafter, a control method of combining the front and lateral surfaces of the display unit to approach an application and execute the application or use it as a folder will be described.

Figure 4:
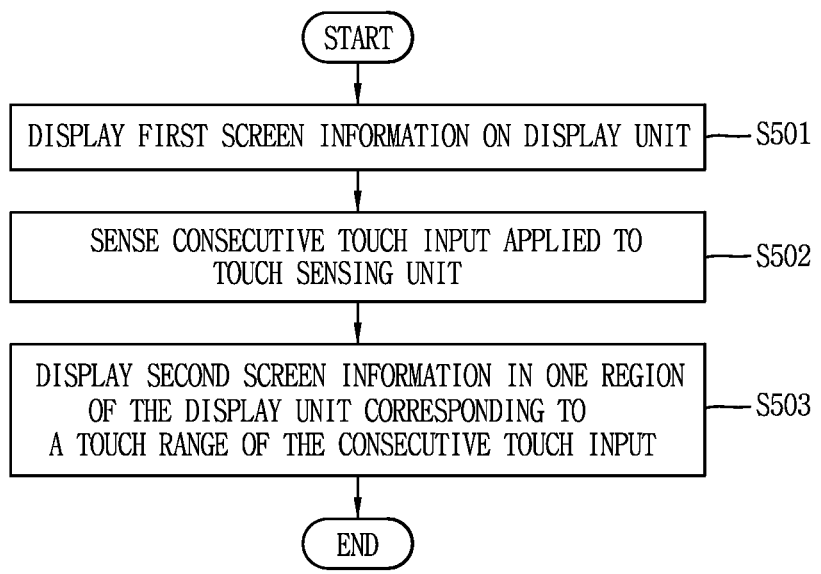
FIG. 4 is a flow chart for explaining a control method of a mobile terminal according to an embodiment of the present disclosure.
Figure 5A:
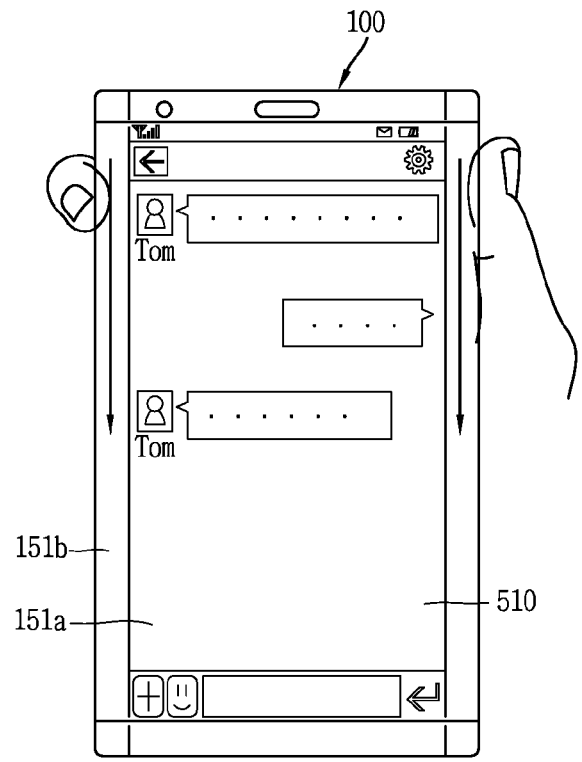
FIGS. 5A(a) to 5D(c) are conceptual views for explaining a control method of a mobile terminal according to various embodiments of the present disclosure.
Figure 5A:
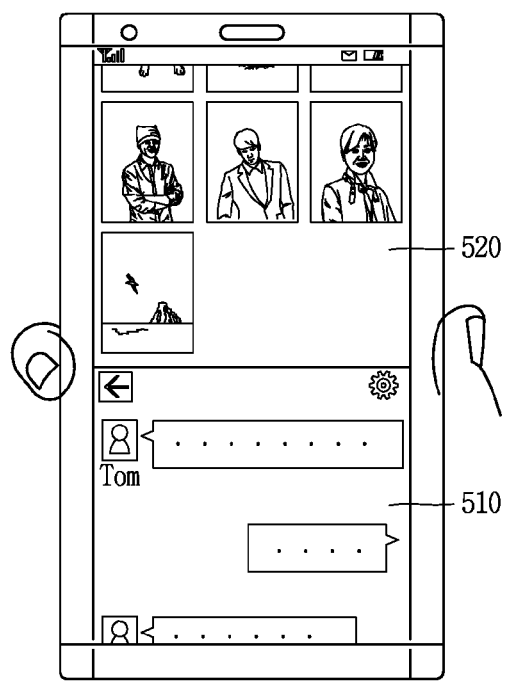
Figure 5A:
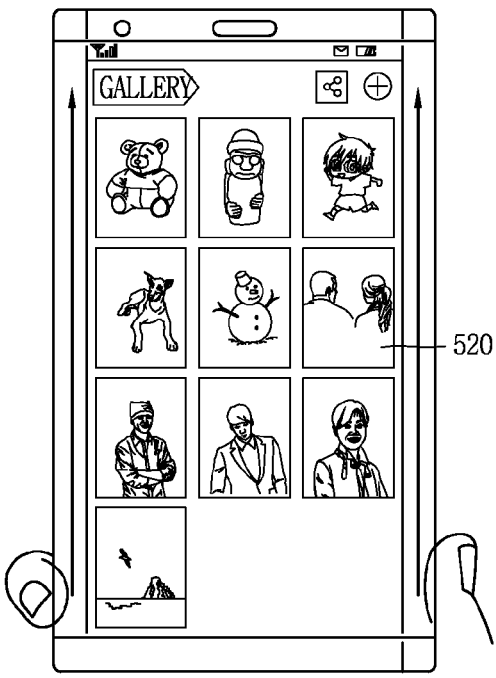
Figure 5A:
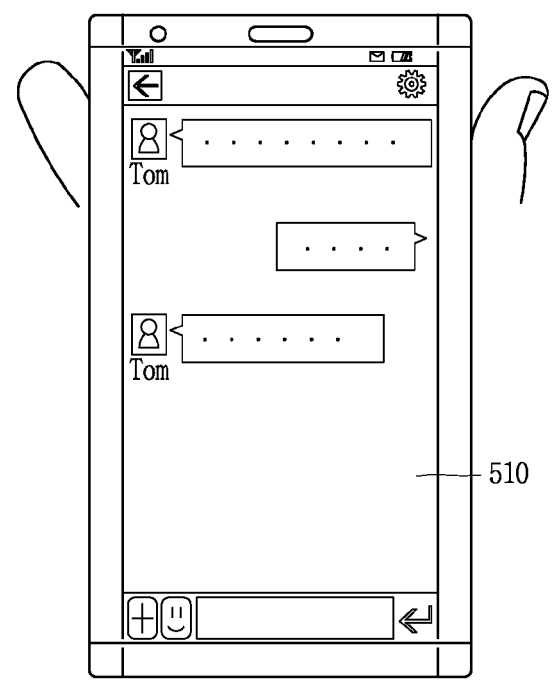

FIG. 4 is a flow chart for explaining a control method according to an embodiment of the present disclosure, and FIGS. 5A(a) to 5D(c) are a conceptual view for explaining the control method of FIG. 4.

The display unit 151a displays first screen information 510. For example, the first screen information 510 may correspond to an execution screen of an activated application. For example, the first screen information 510 may correspond to an execution screen of a message application.

The mobile terminal 100 may execute a plurality of applications, and activate one of the plurality of applications. Though not shown in the drawing, the controller may control the display unit to display visual information on the application being executed by a preset control command. The controller may control the display unit to sequentially display visual information in the activated sequence of the corresponding applications based on the control command.

The touch sensing unit 151b is formed adjacent to both lateral surfaces of the display unit 151 along a length direction of the display unit 151. The user may apply a touch input to the touch sensing unit 151b formed by interposing the display unit 151 therebetween with his or her two fingers.

Though not shown in detail in the drawing, the touch sensing unit 151b may be configured with a display device for displaying visual data, and may be formed to be incorporated with the display unit 151 as described above. Accordingly, preset visual information may be displayed on the touch sensing unit 151b configured with the display device. For example, the controller may control the touch sensing unit 151b to illuminate one region of the touch sensing unit 151b to which the user's touch is applied.

A consecutive touch input is applied to the touch sensing unit 151b (S502). Here, the touch inputs may be preferably applied to the both touch sensing units 151b at the same time, but may not be necessarily limited to this. The consecutive touch input is an input scheme due to a finger moving along a length direction of the display unit. The touch range of the consecutive touch inputs is defined according to a length to which the touch input is applied as well as a location to which an initial touch is applied.

The controller controls the display unit 151 to display second screen information in one region of the display unit corresponding to the touch range of consecutive touch inputs (S503).

According to an embodiment illustrated in FIGS. 5A(a) to 5A(d), the second screen information may correspond to an execution screen of another application. In other words, the controller controls the display unit 151 to switch part of first screen information which is the execution screen of the first application to second screen information which is an execution screen of a second application. Referring to FIGS. 5A(a) to 5A(d), the second application may correspond to an execution screen of a gallery application for displaying a plurality of images.

The display unit displays the second screen information 520 in a partial region of the display unit corresponding to a touch distance based on a touch range corresponding to the touch distance applied to the touch sensing unit 151b. In other words, the partial region corresponds to a region corresponding to a distance from an initial touch applied to the touch sensing unit 151b to a final movement position. Touch inputs applied to the both touch sensing units 151b may preferably move in substantially parallel to each other, but may not be necessarily limited to this.

Furthermore, the display unit displays the second screen information 520 in a region corresponding to the touch range, and displays part of the first screen information 510 in the remaining region. The second screen information 520 corresponds to part of an execution screen of the second application.

When the touch range corresponds to part of the length of the display unit, the controller activates the first and the second application at the same time, and controls the display unit to display part of the execution screen of the first and the second application in each divided region of the display unit.

Here, the second application corresponds to an application being executed along with the first application but in an inactive state. Furthermore, the second application corresponds to an application activated immediately prior to or subsequent to activating the first application.

The touch sensing unit 151b senses a touch input applied in both directions, namely, applied along a length direction or an opposite direction thereof of the display unit. For example, when a touch input consecutively applied from the top to the bottom, the controller may control the display unit to activate an application immediately prior to activating a currently activated application, and display an execution screen thereof.

Furthermore, the controller controls the display unit to display one region of each screen information along a direction in which the touch input is applied. For example, when the touch input moves in a downward direction based on the display unit, the display unit display an upper region of the first screen information 510 at a lower end portion of the display unit, and a lower region of the second screen information 520 at an upper end portion of the display unit.

The controller controls the display unit to limit the output of part of the first screen information and display second screen information in a larger region in real time as increasing the touch range from a moment at which an initial touch is applied to the touch sensing unit 151b.

Referring to FIGS. 5A(b) and 5A(c), when the touch range is applied in a substantially similar manner to the length of a lateral surface of the display unit, the controller controls the display unit to display the second screen information 520 as a whole on the display unit. For example, when the touch input is consecutively applied from the uppermost end to the lowermost end of a lateral surface of the display unit, the controller controls the display unit to switch from the first screen information 510 to the second screen information 520. Furthermore, the controller may control the display unit to increase a region displayed with the second screen information 520 as decreasing a region displayed with the first screen information 510.

Accordingly, the controller may switch the first application to an inactive state.

Referring to FIGS. 5A(c) and 5A(d), the touch sensing unit 151b senses a touch input applied in an opposite direction. In other words, when a touch input moving from the lowermost end of the touch sensing unit 151b to the uppermost end thereof by the touch sensing unit 151b, the controller controls the display unit to switch the second screen information 520 to the first screen information 510 again.

In other words, the controller controls the display unit to display the execution screen of a previous application again based on the touch input applied in an opposite direction.

The controller may sequentially record applications activated by the user, and sequentially display the execution screens of the applications based on the direction of a consecutive touch input applied to the touch sensing unit 151b. It is assumed that a first through a third application are being executed, and a first application through a third application have been sequentially activated, and an execution screen of the second application is currently being displayed on the display unit. The controller may control the display unit to display an execution screen of the first application based on a touch input applied to the touch sensing unit 151b in a downward direction, and display an execution screen of the third application based on a touch input applied to the touch sensing unit 151b in an upward direction.

Accordingly, the user may immediately execute an application that has been previously executed regardless of entering an additional control command to check information on an application currently being executed again.

A control method of each application in a state that first and second screen information are displayed will be described with reference to 5B. The controller displays the first screen information 510 in one region of the display unit based on a consecutive touch input applied to the touch sensing unit 151b, and displays the second screen information 520 in the remaining region.

Figure 5B:
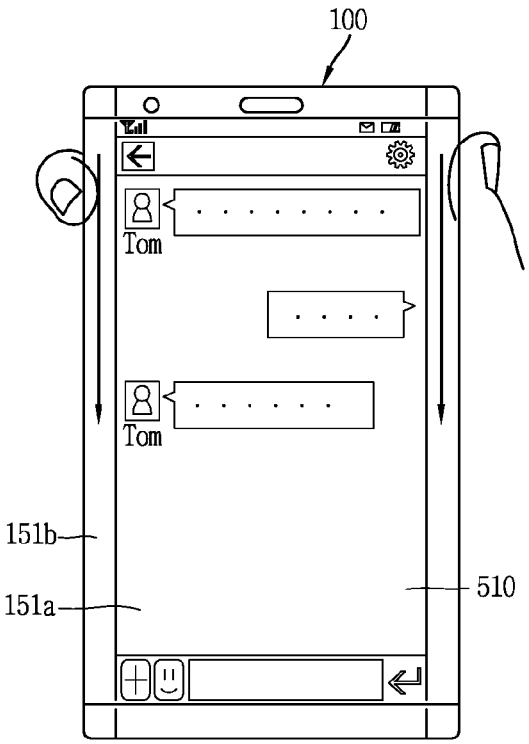
Figure 5B:
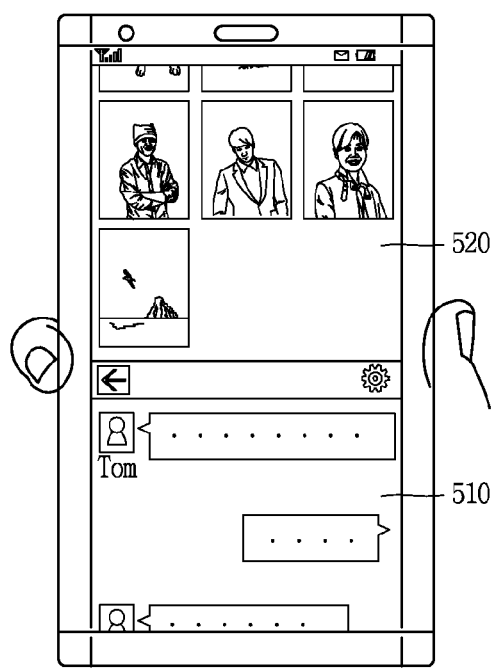
Figure 5B:
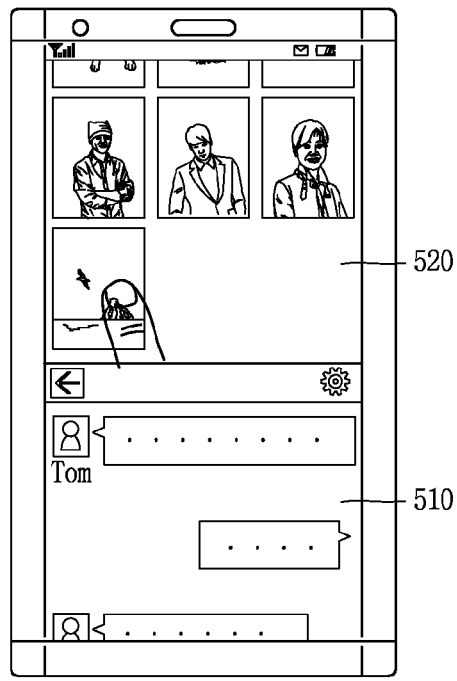
Figure 5B:
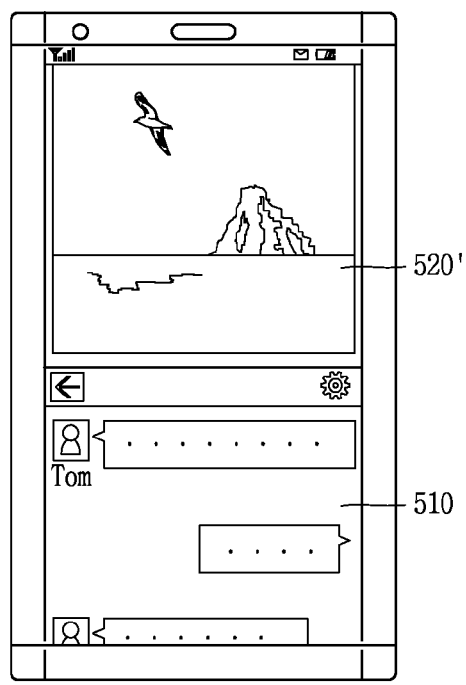

Referring to FIGS. 5B(c) and 5B(d), the controller may apply a touch input to the second screen information 520 to control the second application. For example, when the second application corresponds to a gallery application for displaying images stored in the memory 160, and the second screen information 520 includes a plurality of images in a reduced size.

In case where a plurality of images are displayed, if a touch input is applied to one image, then the controller controls the display unit to display only the image in an enlarged size.

According to the present embodiment, when a touch input is applied to one image contained in the second screen information 520, the controller controls the display unit to display at least part 520' of the image in the remaining region of the display unit. In other words, the display unit controls the second application based on a touch input applied to the second screen information 520, and displays a changed execution screen of the second application in the remaining region.

Though not shown in the drawing, the first application may be controlled by a touch input applied to the first screen information 510. In other words, the controller may activate the first and the second application at the same time while the first and the second screen information 510, 520 are displayed at the same time.

Accordingly, the user may activate the first and the second application at the same time, and receive the resultant execution screens at the same time.

A control method of providing an icon of a recommended application based on a touch input applied to the touch sensing unit 151b will be described with reference to FIG. 5C(a) to 5C(c).

For example, the controller controls the display unit to display an execution screen of an application that has been just previously activated based on a touch input applied to the touch sensing unit 151b in a downward direction, and display an execution screen of an application that has been just subsequently (more recently) activated based on a touch input applied to the touch sensing unit 151b in an upward direction.

Figure 5C:
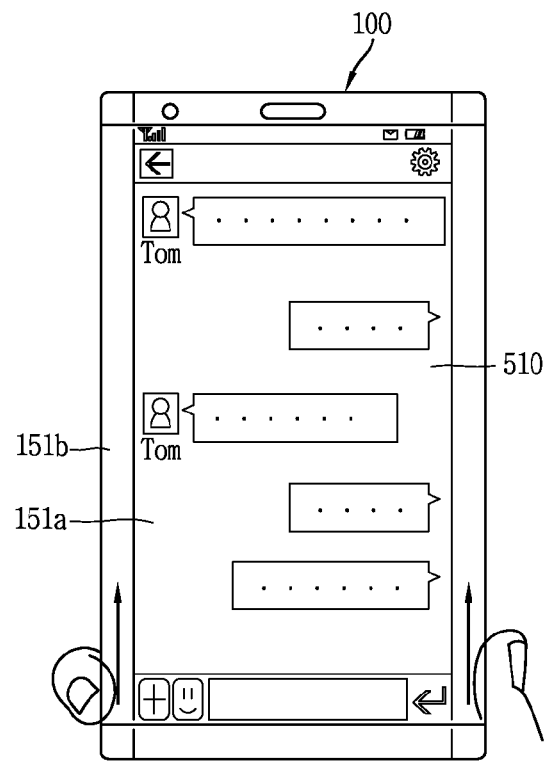
Figure 5C:
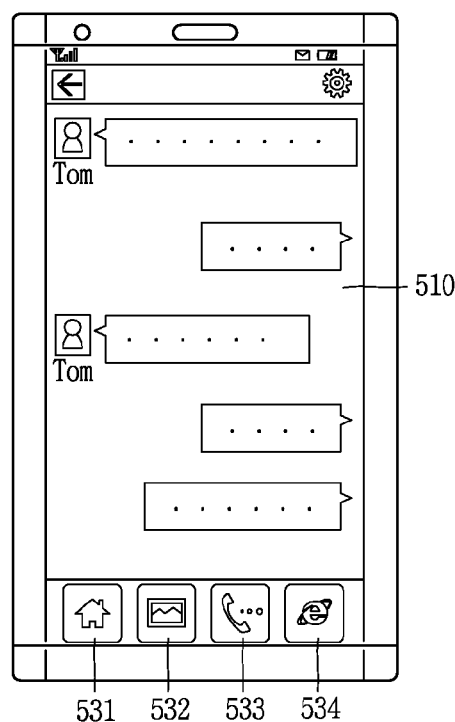
Figure 5C:
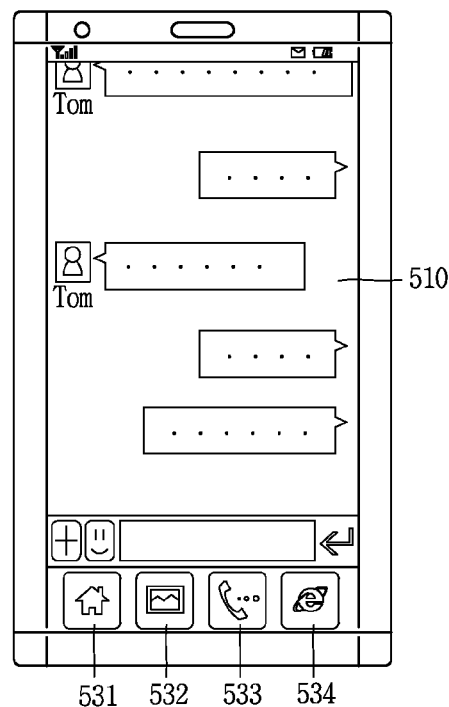

Referring to FIGS. 5C(a) and 5C(b), when a touch input is applied to the touch sensing unit 151b in an upward direction, the controller display an execution screen of an application that has been recently activated rather than the current application. However, when the first application of the first screen information 510 is a most recently activated application, the controller provides information on a recommended application.

In other words, the controller controls the display unit to display recommended icons corresponding to at least one application at a lower end portion of the display unit. The recommended application may be previously set by the user, or recommended as a result of analyzing the first screen information 510.

For example, the recommended icon may include a first icon 531 previously set by the user. The first icon 531 may correspond to a graphic image for receiving a touch input to switch the screen to a home screen page.

The recommended icon may include a second icon 532 for an application expected to be used through the analysis of the first screen information 510 and a third icon 533 for an application associated with information contained in the first screen information 510. For example, when the first screen information 510 corresponding to an execution screen of a message application is displayed, the first screen information 510 may include text such as "Show me a photo" in the message. The controller may expect that the user executes a gallery application to share images, and display a second icon 532 of the gallery application.

Furthermore, when a phone number is contained in the message, the controller may control the display unit to display a third icon 533 of the phone application.

Furthermore, the controller analyzes the execution trend of each application using the recorded execution history of a user. For example, the controller may recommend an application having a high frequency of being executed along the message application. For example, when a user frequently executes an Internet connection application while activating the message application, the display unit may display a fourth icon 534 of the Internet connection application.

The recommended icons are displayed to occupy a preset region of the display unit. Referring to FIG. 5C(b), the recommended icons are displayed to cover part of the first screen information 510.

On the other hand, referring to FIGS. 5C(a) and 5C(c), the display unit may display the recommended icons to limit the display of an upper end portion of the first screen information 510 and connect to a lower end portion of the first screen information 510 by moving the first screen information 510. In other words, the display unit may move the first screen information 510 in an upward direction and display the icons in the remaining region thereof.

However, the location of displaying the icons may not be necessarily limited to this. Furthermore, when a touch input applied in a downward direction is applied to the touch sensing unit 151b in case where the display unit currently display an execution screen of an application executed at the very first time, the controller may control the display unit to display the recommended icons at an upper portion of the display unit.

Accordingly, even when there no longer exists an execution screen of application to be provided, the user may execute his or her desired application in a more convenient manner using the recommended application.

Figure 5D:
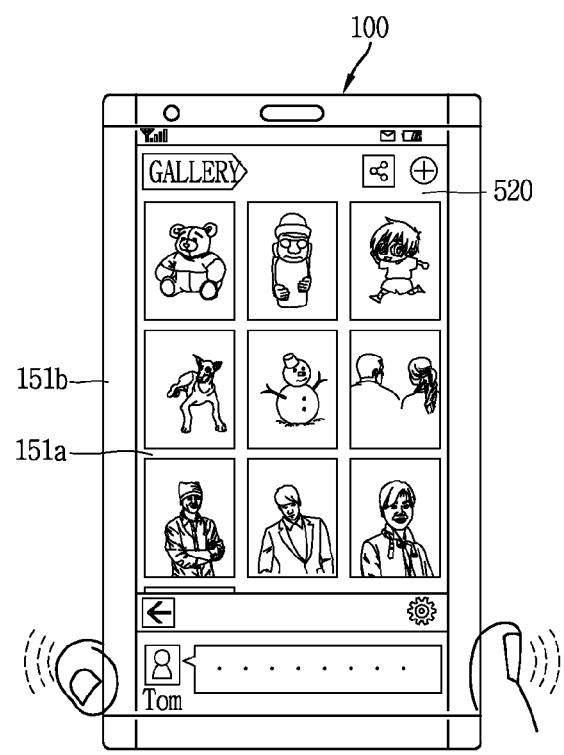
Figure 5D:
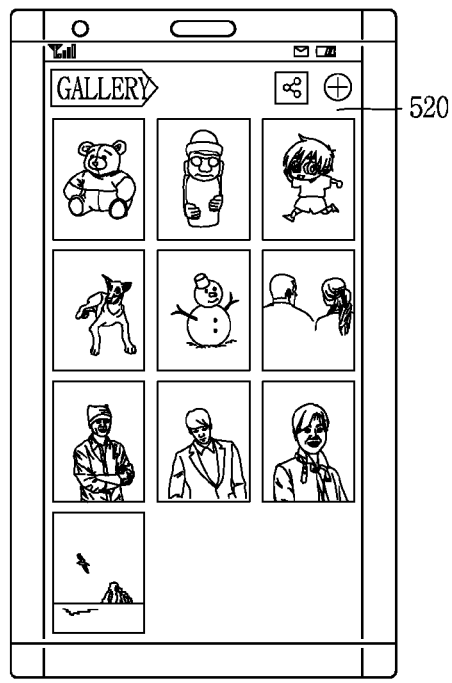
Figure 5D:
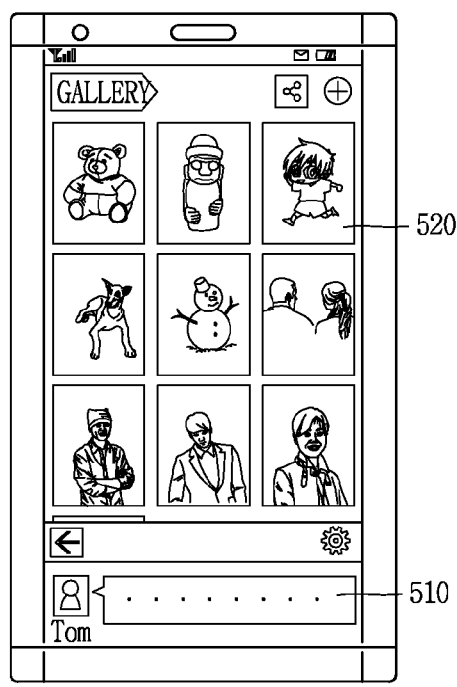

A control method of displaying two screen information at the same time will be described with reference to FIGS. 5D(a) to 5D(c). Referring to FIG. 5D(a), when the consecutive touch input is suspended in one region of the touch sensing unit 151b, the controller displays part of the first and the second screen information 510, 520 at the same time on the display unit. A boundary between the first and the second screen information 510, 520 corresponds to the location of the touch sensing unit 151b to which the user's touch input is applied.

Referring to FIGS. 5D(a) and 5D(b), when a touch input applied to the touch sensing unit 151b is released, the controller controls the display unit to display only one of the first and the second screen information 510, 520.

For example, when the touch input is released, the controller selects screen information displayed in the largest region of the display unit. Accordingly, the controller controls such that the display of the first screen information 510 is limited, and the second screen information 520 is displayed as a whole on the display unit.

On the other hand, referring to FIGS. 5D(a) and 5D(c), when a preset type of touch input is applied to the touch sensing unit 151b, the controller may control the display unit to display the first and the second screen information 510, 520 at the same time.

For example, when a touch input (for example, long touch input in a suspended state) for a preset period of time is applied to and released from one region of the touch sensing unit 151b while displaying the first and the second screen information 510, 520 at the same time on the display unit, the controller may control the display unit to display the first and the second screen information 510, 520 at the same time. The display region and boundary of the first and the second screen information 510, 520 may correspond to one region of a touch sensing unit to which the long touch input is applied.

Accordingly, the user may receive at least one desired screen information in a more convenient manner.

Figure 6A:
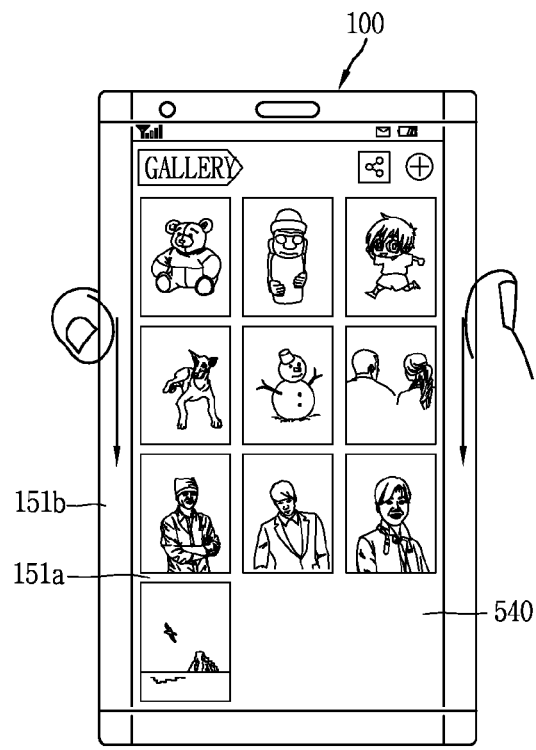
FIGS. 6A(a) to 6B(c) are conceptual views for explaining a control method of displaying additional information on one content selected from a plurality of contents contained in screen information.
Figure 6A:
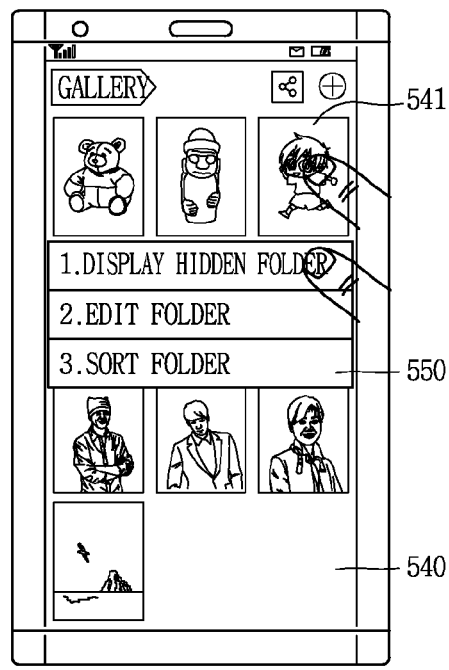
Figure 6A:
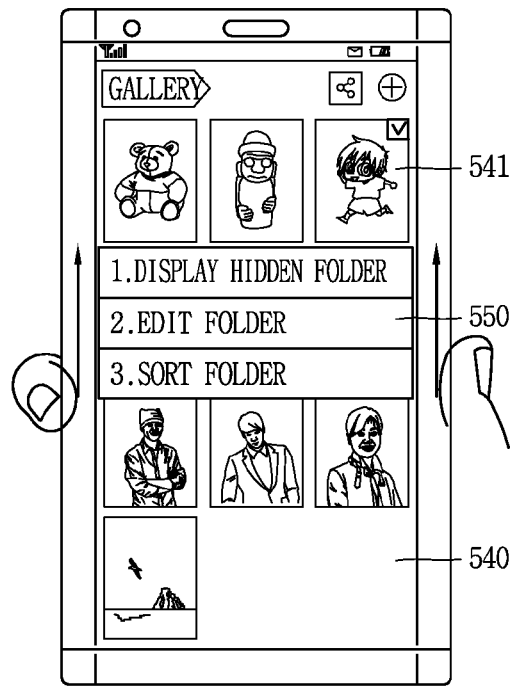
Figure 6A:
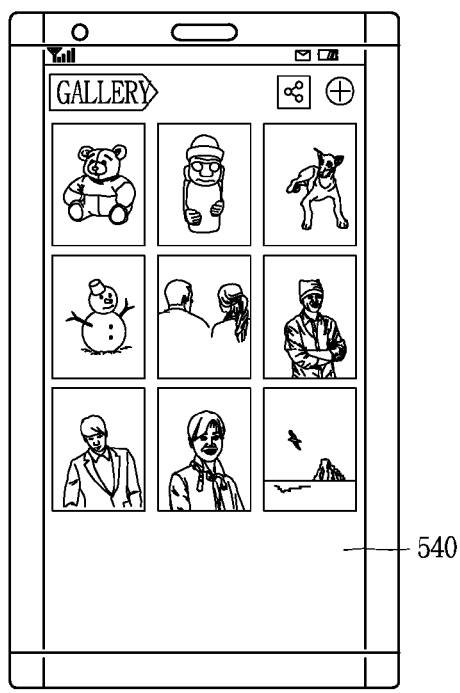

FIGS. 6A(a) to 6A(d) and 6B(a) to 6B(c) are conceptual views for explaining a control method of displaying additional information on one content selected from a plurality of contents contained in screen information.

FIG. 6A(a) illustrates a display unit for displaying a first execution screen 540 of a gallery application in which a plurality of images acquired through different views of angle or schemes are displayed at the same time. The controller senses one region of the touch sensing unit 151b to which the touch input is applied. The first execution screen 540 contains a plurality of contents, and the contents correspond to a plurality of images.

The controller selects at least one content displayed in one region of the display unit corresponding to one region of the touch sensing unit 151b on which the touch input is sensed. Here, one region of the display unit corresponding to one region of the touch sensing unit 151b is determined by two touch input positions applied in parallel to both touch sensing units 151b formed at the both lateral surface thereof. Defining a virtual line connecting two touch input positions applied to the both touch sensing units 151b, the virtual line passes one region of the display unit based on a touch input consecutively applied along one direction. The controller selects content displayed in one region of the display unit through which the virtual line passes. In other words, the controller controls the display unit to display content displayed in a row on the display unit corresponding to the touch range.

The controller controls the display unit to display first additional information 550 associated with the selected content. The first additional information 550 may be preferably displayed in a region adjacent to the selected content. Furthermore, the controller may control the display unit to display in such a manner that the first additional information 550 covers one region of the first execution screen 540. However, a region of the display unit displayed with the first additional information 550 may not be necessarily limited to this. For example, the controller may control the display unit to move part of the first execution screen 540 to another region to secure a region in which the first additional information 550 is to be displayed.

The first additional information 550 may correspond to a menu for controlling (or editing) the selected content. For example, the first additional information 550 may correspond to a menu image for receiving a touch input to hide, edit or arrange the contents.

The controller may select a plurality of contents displayed in one row since the plurality of contents are selected by a touch input in a row unit. In this case, the controller may select only one content from the plurality of contents using a touch input applied to the display unit. For example, as illustrated in the drawing, three images are selected based on a touch input applied to the touch sensing unit 151b, and the display unit displays a menu image for the three images. Consequently, the controller selects one image based on a touch input applied to the display unit, and controls the selected one image based on an additional touch input applied to the menu image. As illustrated in the drawing, the controller controls the display unit to cover or (limit the display of) the selected one content 541 based on a user's plurality of touch inputs.

The controller may control the display unit to limit the display of the first additional information 550 based on a touch input applied along a direction opposite to the touch sensing unit 151b. In other words, the controller controls the display unit to select content using a touch input applied along the one direction and display the first additional information 550 according to the selected content, and controls the display unit to allow the displayed first additional information 550 to disappear by a touch input applied along an opposite direction.

For example, a consecutive touch input applied along the opposite direction may be defined as a touch input applied in such a manner that the virtual line passes through the first additional information 550.

Referring to FIGS. 6A(c) and 6A(d), the controller may control the display unit limit the display of the first additional information 550 and the selected one content 541 based on a touch input applied to the touch sensing unit 151b.

Furthermore, though not shown in the drawing, all contents contained in a row through which the virtual line passes may be selected based on the touch input. For example, when text formed with a plurality of rows is contained in the execution screen, the controller may select the plurality of rows, and perform editing on the text.

Accordingly, the user may select at least one content displayed on the display unit using a touch input to one region of the touch sensing unit, and more easily receive additional information thereon.

A control method of providing distinguished additional information on selected content will be described with reference to FIGS. 6B(a) to 6B(c).

Figure 6B:
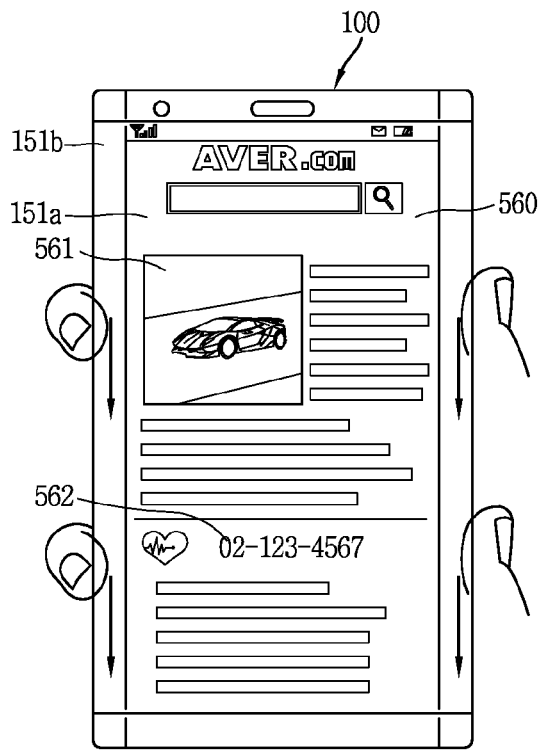
Figure 6B:
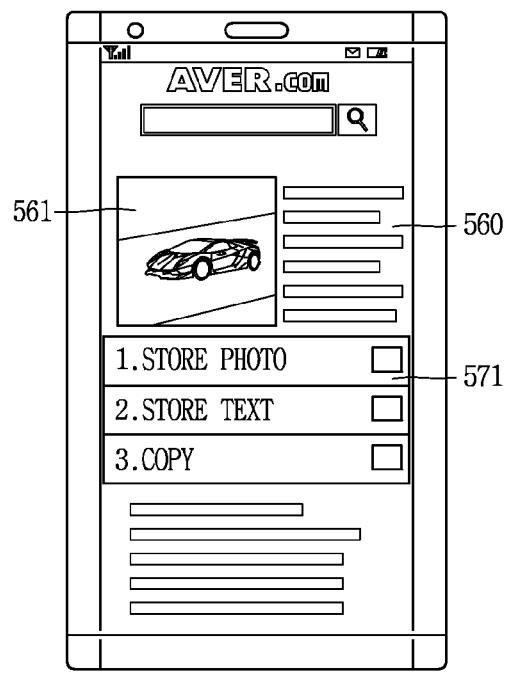
Figure 6B:
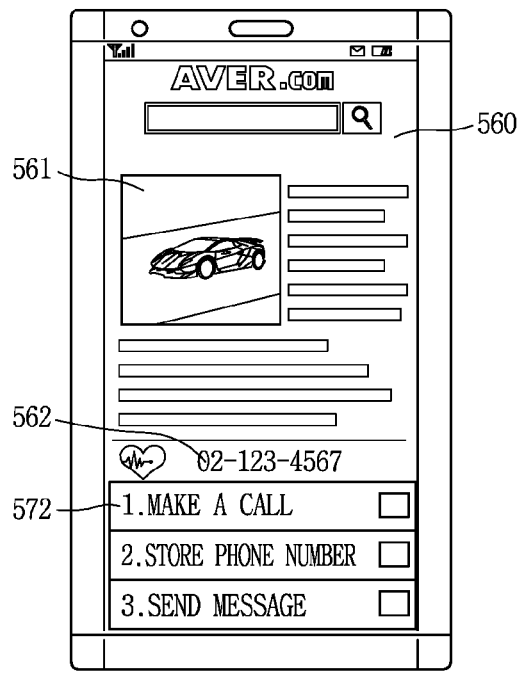

FIG. 6B(a) is a view illustrating a display unit displaying the execution screen 560 corresponding to a web browser screen. The execution screen 560 includes different forms of contents. For example, the execution screen 560 may include an image, an input window, text, video, an image connected to a hyperlink, an icon and the like. For example, the execution screen 560 may include first content 561 containing an image and text and second content 562 with a numeric form.

Referring to FIGS. 6B(a) and 6B(b), the controller selects the first content 561 based on a touch input applied to the touch sensing unit 151b. A method of selecting the content is substantially the same as the method of 6A, and thus the redundant description thereof will be omitted.

The controller may control the display unit to select the first content 561 based on the touch input, and display the second additional information 571 in a region adjacent to the execution screen 560. The second additional information 571 corresponds to information associated with the first content 561. For example, the second additional information 571 may correspond to a menu image configured to receive a touch input for storing the image, storing the text or copying the image and text.

On the other hand, referring to FIGS. 6B(a) and 6B(c), the controller selects the second content 562 based on the touch input. The controller controls the display unit to display third additional information 572 associated with the second content 562 in a region adjacent to the 562 the second content 562.

For example, the third additional information 572 may include a menu image for placing a call using the number, storing a numeral as a phone number or receiving a touch input to transmit text. The controller activates an application based on a touch input applied to one region of the menu image and performs a selected function using information contained in the content.

Accordingly, the user may select one of a plurality of contents, and receive additional information associated with the selected content.

Figure 7A:
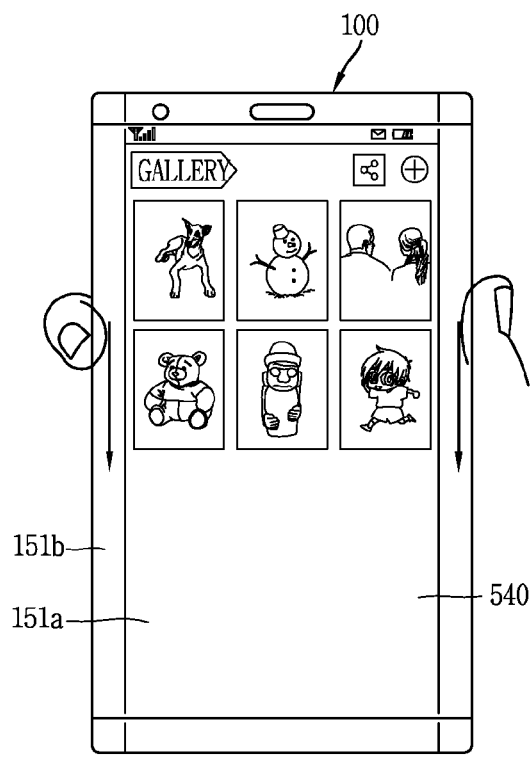
FIGS. 7A(a) to 7C(c) are conceptual views for explaining a control method of displaying lower information of the selected content.
Figure 7A:
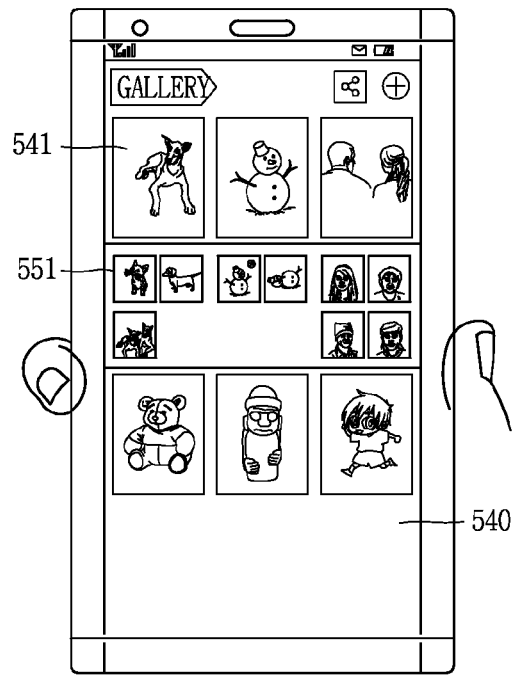
Figure 7A:
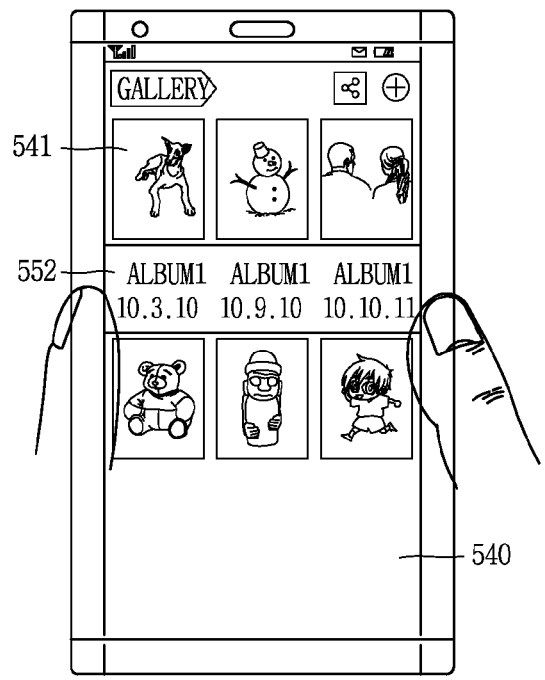

FIGS. 7A(a) to 7C(c) are conceptual views for explaining a control method of displaying lower information of the selected content.

FIG. 7A(a) is a view illustrating a display unit for displaying the first execution screen 540 containing a plurality of image groups. Though not shown in the drawing, the controller may display at least one lower image contained in the image group on the display unit based on a touch input applied to the image group.

Referring to FIGS. 7A(a) and 7A(b), the controller selects at least one image group displayed in a row of the image group contained in the first execution screen 540 based on a touch input applied to the touch sensing unit 151*b*. The controller may control the display unit to display at least one image contained in the selected image group based on the touch input consecutively applied to the touch sensing unit 151*b*.

In other words, the controller may preferably control the display unit to display first lower information 551 of the selected image group, and display the first lower information 551 in a region adjacent to the selected image group 541.

Furthermore, the controller may control the display unit to display the first lower information 551 in one region of the display unit through which a line defined by a consecutive touch input applied to the touch sensing unit 151*b* passes. Furthermore, the display unit may display a larger number of the first lower information 551 as increasing a region of the applied touch input.

For example, when the image group selected by the touch sensing unit 151*b* contains a plurality of images, and the display unit displays a plurality of images in a preset size, the controller controls the display unit to display the larger amount of images as increasing the touch range.

In other words, the user may check a plurality of images contained in the image group without applying a touch input to an image group displayed on the display unit. Furthermore, when a plurality of image groups are selected, the user may receive distinguished images contained in each image group at the same time.

Referring to FIGS. 7A(a) and 7A(c), the controller controls the display unit to display the second lower information 552 of the selected image group. For example, the second lower information 552 may correspond to the generation information, setting information, size or the like of the image group.

A control method of providing third lower information contained in an application without activating the application in a home screen page will be described with reference to FIGS. 7B(a) to 7B(b).

Figure 7B:
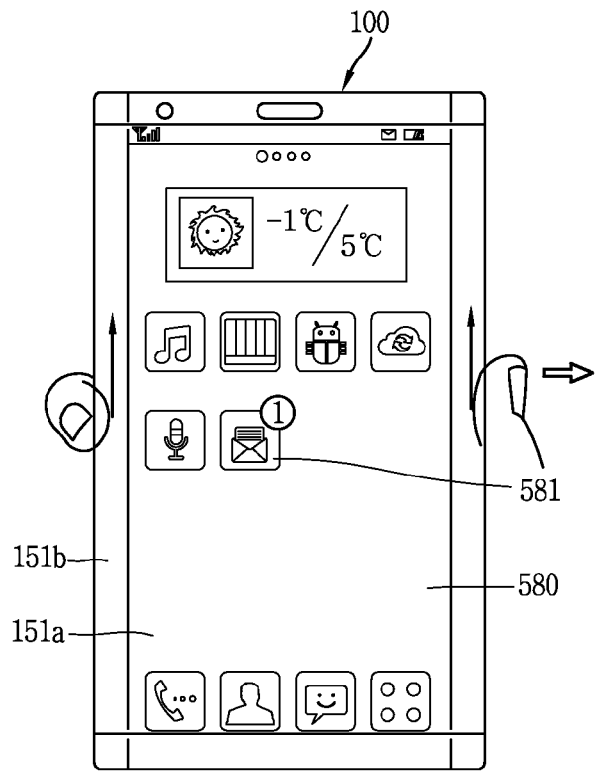
Figure 7B:
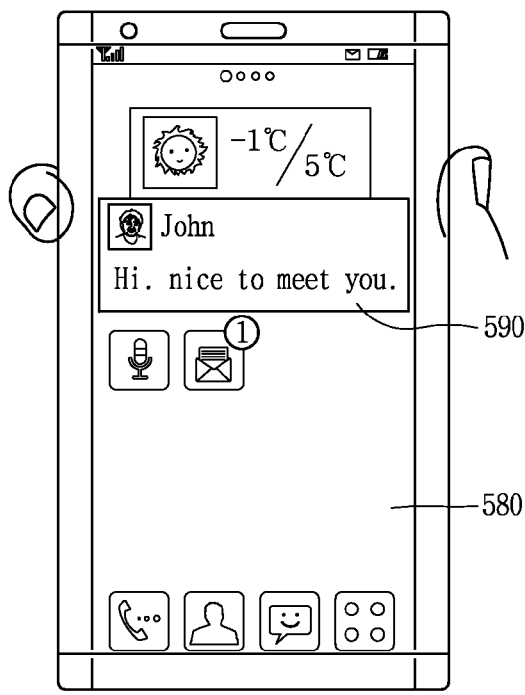

FIG. 7B(a) is a view illustrating a display unit for displaying third screen information 580 corresponding to a home screen page. The third screen information 580 may include at least one icon for receiving a touch input to execute at least one application.

The display unit may further display a notification badge on the icon when an event occurs or is received at the application. For example, when a message is received at the mobile terminal, the display unit may further display a notification badge on the icon 581 of the message application.

The controller may select at least one of the plurality of icons based on a touch input applied to the touch sensing unit 151*b* when the home screen page is displayed.

The controller may control the display unit to display additional information on an application corresponding to the selected icon. For example, the controller selects at least one icon displayed in one region of the display unit corresponding to a touch range of the touch sensing unit 151*b*. The controller may display third lower information 590 on the application of an icon formed with the notification badge among the selected icons.

For example, when the icon 581 of the message application is selected by the touch range, the controller may control the display unit to display the received message.

However, the present disclosure may not be necessarily limited to this, and the controller may control the display unit to display the additional information of an application corresponding to the selected icon when there is no event or notification corresponding to the selected icon. Here, the additional information may correspond to the description of the application, information associated with setting, used memory or the like.

Furthermore, the display unit may display the third lower information 590 in one region of the display unit corresponding to the touch range based on the touch range.

Accordingly, the user may receive information on an event on a home screen page without activating an application containing the received event.

Though not shown in the drawing, the controller may control the display unit to limit the display of the third lower information 590 when a touch input in an opposite direction is applied to the touch sensing unit 151*b* or a touch input is applied to one region of the display unit (a region in which the third lower information 590 is not displayed).

Furthermore, when a touch input is applied to the third lower information 590, the controller may control the display unit to activate the application, and display an execution screen of the application.

A notification image displayed on the touch sensing unit 151*b* will be described with reference to FIGS. 7C(a) to 7C(c). According to the present embodiment, the touch sensing unit 151*b* may be implemented as a display device for displaying visual information. Accordingly, if necessary, the controller may control the touch sensing unit 151*b* to display an image. The present embodiment may not be necessarily limited to the control method illustrated in the drawing, and may be applicable to all the foregoing embodiments.

Figure 7C:
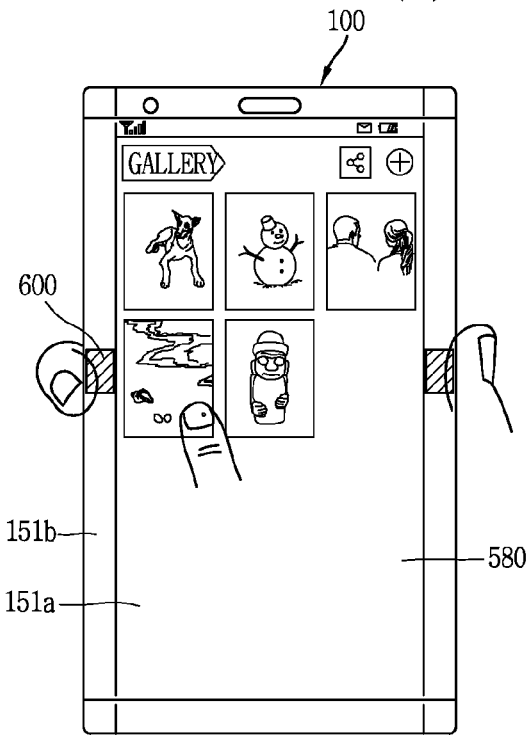
Figure 7C:
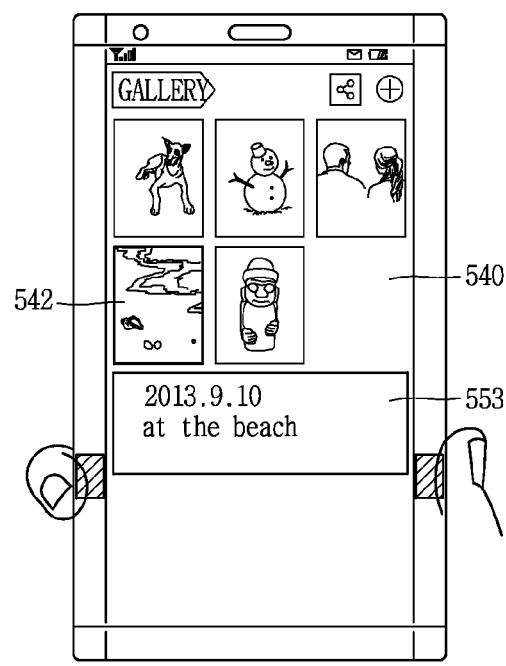
Figure 7C:
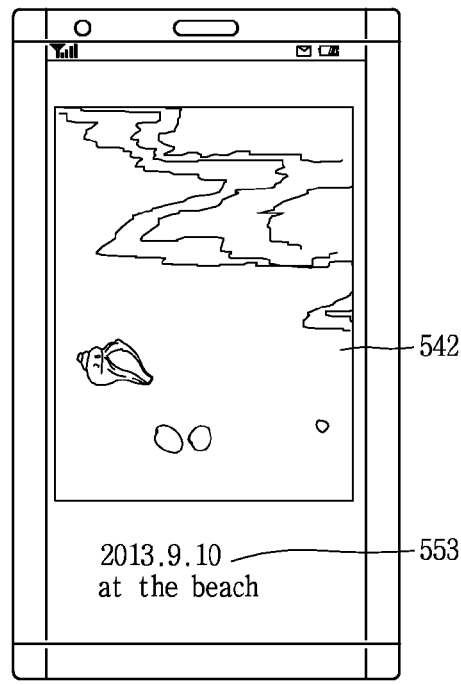

Referring to FIGS. 7C(a) to 7C(c), when displayable lower information is contained in content, the controller controls such that the notification image 600 is displayed in one region of the touch sensing unit 151*b*. The notification image 600 may be formed with a preset image or form of emitting light. The notification image 600 may be preferably formed in a region adjacent to content containing additional information or lower information.

For example, when one image 542 of the images displayed on the display unit contains lower information 553 in a state that a gallery application is activated, the controller controls the touch sensing unit 151*b* to display a notification image 600 in a row displayed with the image 542.

Proactively describing FIGS. 7C(a) and 7C(c), the controller controls the display unit to display the image 542 in an enlarged manner and display the lower information 553 at the same time by a touch input applied to the image 542.

Referring to FIGS. 7C(a) and 7C(b), when the touch range of the touch sensing unit 151*b* contains a display region of the notification image 600, the controller controls the display unit to display the lower information 553.

Furthermore, the controller may control the touch sensing unit 151*b* to move the display location of the notification image 600 based on a consecutive touch input applied to the touch sensing unit 151*b*. However, the present disclosure may not be necessarily limited to this, and the touch sensing unit 151*b* may modify the shape of the notification image 600 or fix the location of the notification image 600 based on the touch input.

Though not shown in the drawing, when an application executed prior to or subsequent to the execution of the application exists while display an execution screen of one application, the notification image 600 may be displayed at an upper portion or lower portion of the touch sensing unit 151*b*.

Accordingly, the user may apply a touch input to the touch sensing unit 151*b* to check whether or not there is receivable information or content associated with receivable information in advance.

Figure 8A:
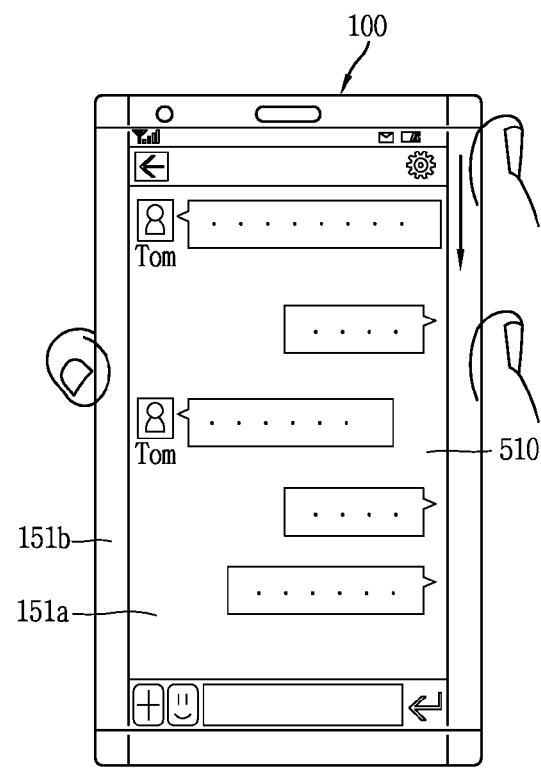
FIGS. 8A to 8C are a conceptual view for explaining a control method according to a touch scheme of a touch input applied to touch sensing units at both sides thereof.
Figure 8B:
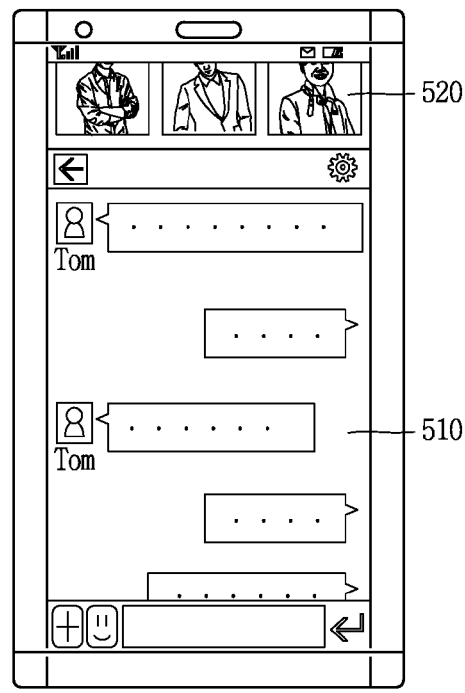
Figure 8C:
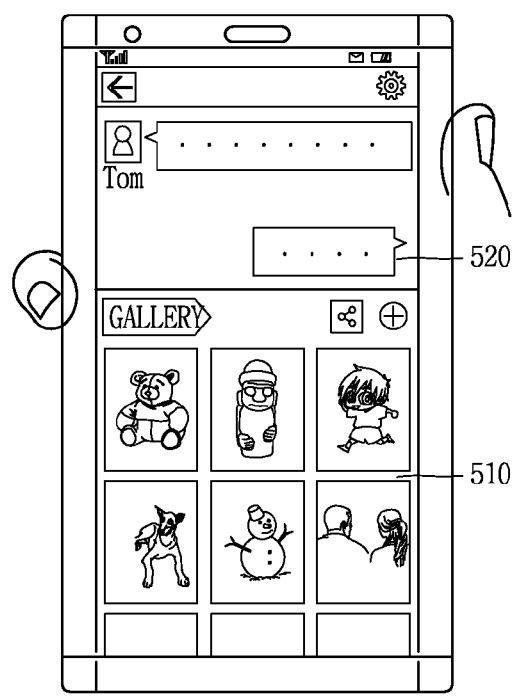

FIGS. 8A and 8C are a conceptual view for explaining a control method according to a touch scheme of a touch input applied to touch sensing units at both sides thereof. FIGS. 8A and 8C are a view illustrating a display unit for display the first screen information of the first application.

The controller may control the display unit based on a consecutive touch input applied to the touch sensing unit 151*b* on one lateral surface thereof in a state that touch inputs are applied to the touch sensing units on both lateral surfaces thereof at the same time.

Referring to FIGS. 8A and 8C, when a long touch input is applied to one region of the left touch sensing unit, and a consecutive touch input moving along one direction is applied to the right touch sensing unit, the second screen information 520 of the second application is displayed along with the first screen information 510.

Here, a region of the display unit on which the second screen information 520 is displayed is based on the touch range of a touch input applied to the right touch sensing unit 151*b*. In other words, even in case of a consecutive touch input being applied only to one side of the touch sensing unit as well as consecutive touch inputs being applied to the left and right side thereof at the same time, it may be possible to activate another application.

On the other hand, referring to FIGS. 8A and 8C, when a long touch input is applied to the left touch sensing unit 151*b*, and a consecutive touch input is applied to the right touch sensing unit, the controller activates a second application.

However, the controller controls the display unit to display the first and the second screen information 510, 520 using one region of the left touch sensing unit 151*b* to which the long touch input is applied as a boundary. According to the present embodiment, the display information of the screen information cannot be controlled by the touch range of a consecutive touch input to the right touch sensing unit 151*b*.

Accordingly, even if both consecutive touch inputs are not applied to the touch sensing units 151*b* at both sides thereof, it may be possible to control the activation of an application and the display of screen information in a more convenient manner.

Figure 9:
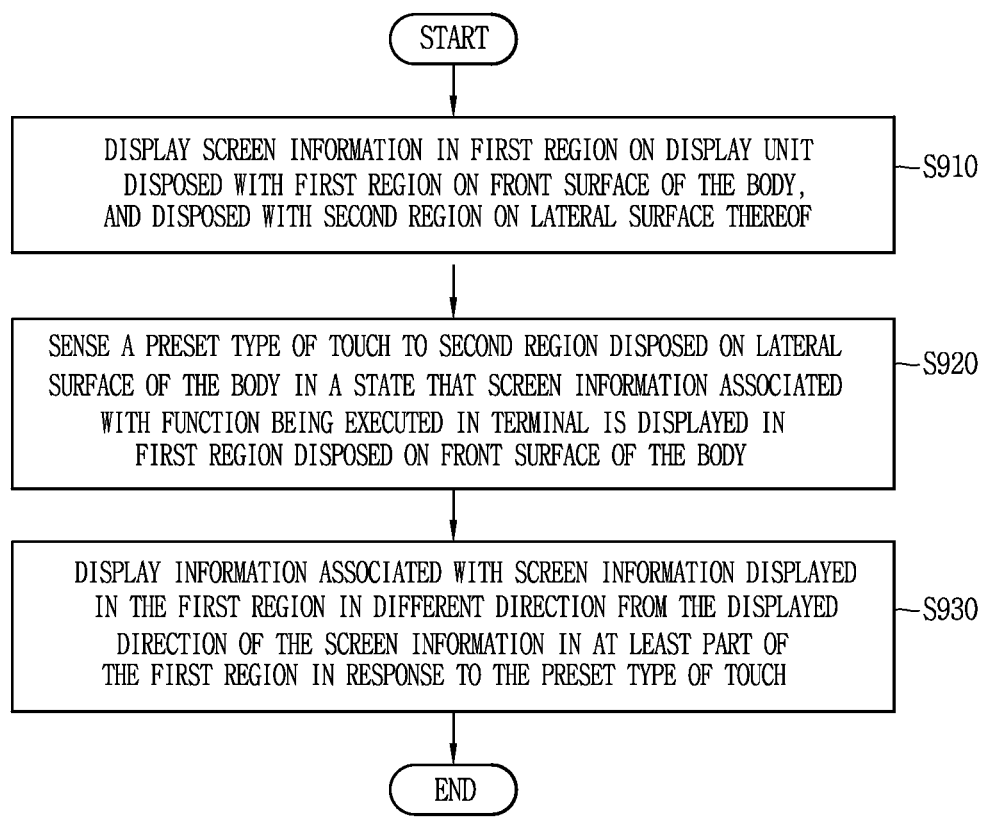
FIG. 9 is a flow chart illustrating a method of controlling both lateral surface of the display unit according to the present disclosure.

Hereinafter, a method of performing various function using both lateral surfaces of the display unit will be described in more detail with reference to the accompanying drawings. FIG. 9 is a flow chart illustrating a method of controlling both lateral surface of the display unit according to the present disclosure, and FIGS. 10A(a) to 10D(b) are conceptual views illustrating the control method of FIG. 9.

A mobile terminal according to the present disclosure may perform the process of displaying screen information in a first region disposed on a front surface of the body (S910).

A mobile terminal according to the present disclosure may further include a display unit 251 on which a first region 261 is disposed on a front surface of the body, and a second region 262, 263 connected to the first region and disposed on a lateral surface of the body.

Screen information associated with a function that can be driven in the mobile terminal may be displayed on the display unit 251. For example, the screen information may be the execution screen information of an application installed in the mobile terminal. Furthermore, a graphic object such as an icon, a widget or the like indicating an application installed in the mobile terminal may be displayed on the display unit 251.

On the other hand, screen information associated with a function that can be driven in the mobile terminal may be displayed even in a second region as well as in the first region 261.

A mobile terminal according to the present disclosure may sense a preset type of touch being applied to a second region disposed on a lateral surface of the body (S920).

The controller 180 may control the first and the second region in an interlocking manner. For example, the controller 180 may control screen information displayed in the first region using a touch applied to the second region. Here, controlling screen information may be understood as performing a function associated with the screen information. For example, the controller 180 may perform the function of scrolling the web page according to a drag input applied to the second region 262 in a state that screen information indicating a web page is displayed in the second region 262.

To this end, a mobile terminal according to the present disclosure may further include a sensing unit 140 capable of sensing a touch applied to the first and the second region. The sensing unit 140 may be a touch sensor configured to sense a touch applied to the display unit 251.

On the other hand, a display unit disposed on a lateral surface of the body may include a second region 262 disposed on a left lateral surface thereof and a third region 263 disposed on a right lateral surface thereof.

The controller 180 may sense a touch applied to at least part of the second and the third region using the sensing unit 140. Here, the controller 180 may determine whether or not a preset type of touch has been sensed in the second and the third region. The preset type of touch may use various touch input schemes such as a drag input, a multi touch or the like applied to at least part of the second and the third region. For example, the controller 180 may sense a drag input applied to the second and the third region at the same time. Here, the direction of the drag input may be the same direction or different directions in the second and the third region.

When a preset type of touch is sensed on at least part of the second and the third region, a mobile terminal according to the present disclosure may perform the process of displaying information associated with screen information displayed in the first region in a direction different from the displayed direction of the screen information (S930).

A mobile terminal according to the present disclosure may display screen information having at least two or more display directions in the first region. In other words, the user may view at least two screen information having different directions at the same time.

To this end, in a state that screen information having a first display direction is displayed in the first region, the controller 180 may display screen information having a second display direction which is different from the first display direction in at least part of the first region.

Here, the display direction of the screen information may denote a direction in which the screen information is displayed on the display unit 251. More specifically, the display direction of the screen information may be determined according to the posture of the mobile terminal body. For example, when the display direction of the screen information displayed in a posture in which a front surface of the display unit 251 is placed in a horizontal direction is defined as a first display direction, the display direction of the screen information displayed in a posture in which a front surface of the display unit 251 is placed in a vertical direction may be defined as a second display direction. In other words, the second display direction may be displayed with a difference of 90 degrees from the first display direction.

Figure 10A:
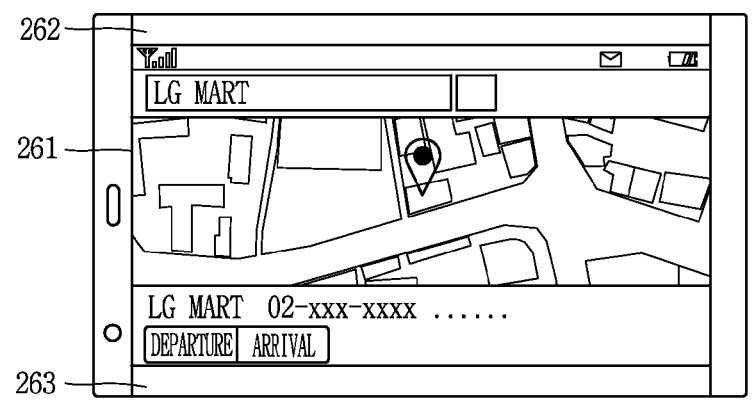
FIGS. 10A(a) to 10D(b) are conceptual views illustrating the control method of FIG. 9.
Figure 10A:
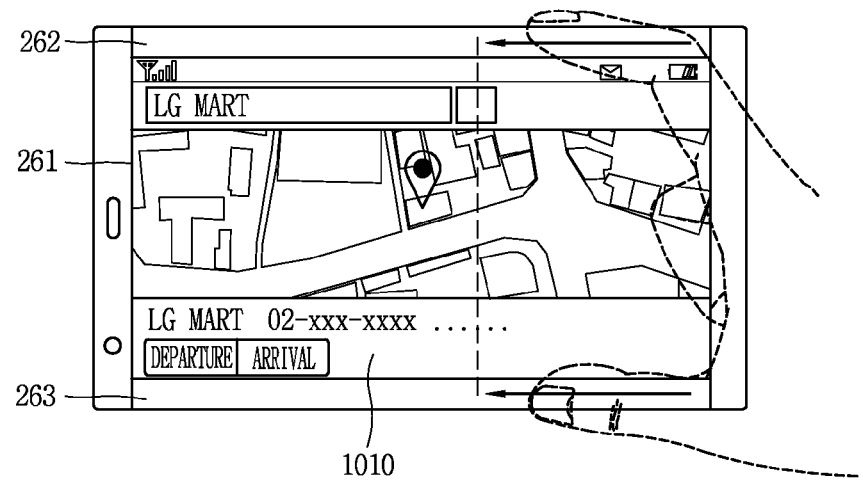
Figure 10A:
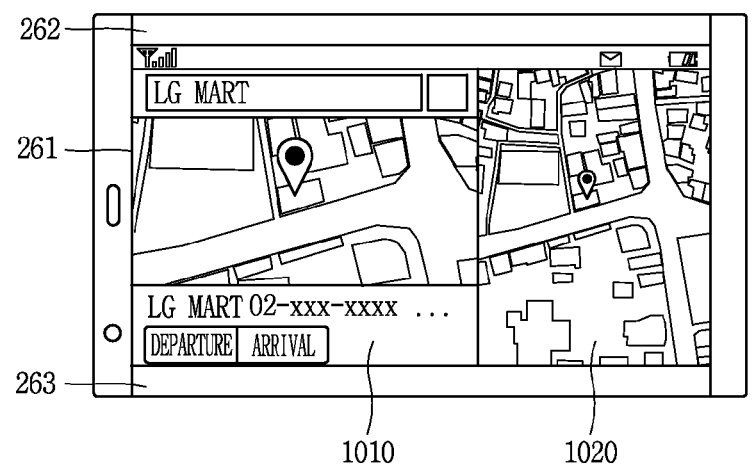

According to the present disclosure, the screen information having different directions may denote screen information displayed according to the posture of the body. For example, as illustrated in FIG. 10A(c), screen information 1010 having a first display direction may denote screen information displayed when the body is placed in a horizontal direction, and screen information 1020 having a second display direction may be understood as screen information displayed when the body is place in a vertical direction.

Furthermore, the display direction of the screen information may be determined by a preset type of touch. For example, the display direction of the screen information may be determined according to the direction of a drag input applied to the second region.

Here, in a state that screen information having the first display direction is displayed, the second display direction may be determined by a direction in which a preset touch is applied. For example, the controller 180 may determine a direction corresponding to the direction of a drag input applied to the second region as a second display direction.

Here, screen information having the first display direction and screen information having the second display direction may be screen information associated with each other. For example, when screen information having the first display direction is screen information indicating the outgoing and incoming record of SMS text messages, screen information having the second display direction may be screen information indicating a list of recipients capable of transmitting an SMS text messages.

For another example, screen information having the second display direction may be screen information to be displayed in the first region when screen information having the first display direction is displayed in the second display direction. More specifically, screen information displayed in the first region may be displayed any one of the first display direction and second display direction. In this case, in a state that screen information having the first display direction is displayed in the first region, the controller 180 may display the same information in the second display direction at the same time.

Furthermore, screen information having the first display direction and screen information having the second display direction are screen information unrelated to each other. For example, screen information having the first display direction is screen information associated with the execution of a first application installed in the mobile terminal, screen information having the second display direction may be screen information associated with the execution of a second application which is different from the first application. Here, the second application may be any one of a plurality of applications being currently executed in the mobile terminal which is different from the first application.

On the other hand, according to the present disclosure, in addition to the first and the second display direction, screen information having various display directions such as a third and a fourth display direction may be displayed at the same time. Hereinafter, a case where two screen information having two directions are displayed at the same time will be described, but it may be also applicable to a case where a plurality of screen information having a plurality of display directions are displayed.

In a state that screen information having the first display direction is displayed, the controller 180 may display screen information having the second display direction in at least part of the screen information having the first display direction.

More specifically, the controller 180 may display screen information having the second display direction in a region corresponding to a region in which a preset type of touch is sensed. Here, screen information having the first display direction may maintain the display state as it is. In this case, screen information having the second display direction may be displayed to be overlapped with screen information having the first display direction.

Here, a region displayed with screen information having the second display direction may be determined based on a region in which the preset type of touch is sensed in the first region. For example, when the preset type of touch is a drag input applied to the second and the third region 262, 263 at the same time, screen information having the second display direction may be displayed in a region having a length corresponding to a length over which the drag input is sensed.

Furthermore, when a preset type of touch is sensed, the controller 180 may switch screen information having the first display direction into screen information having the second display direction. In this case, the user may switch the display direction of the screen information with no posture change of the display unit 251. Here, the posture of the display unit 251 may be either one of a posture in which the display unit 251 is placed in a vertical direction and a posture in which the display unit 251 is placed in a horizontal direction.

When screen information having the first and the second display direction are screen information relevant to each other in a state that the screen information having the first and the second display direction are displayed in the first region 261 at the same time, an indicator indicating the relevance may be displayed on at least one of the screen information having the first and the second display direction.

More specifically, when at least part of the screen information having the first display direction and screen information having the second display direction are the same, the controller 180 may display the same portion to be visually distinguished from the remaining screen information.

For example, when screen information having the first display direction is screen information indicating map information and screen information having the second display direction is screen information indicating more extended map information containing the map information, the controller 180 may process a region indicating the same information as the screen information having the first display direction in the screen information having the second display direction in highlighted manner to visually distinguish it from the remaining screen information.

Furthermore, when screen information having the first display direction and screen information having the second display direction are screen information associated with each other, the controller 180 may control the other screen information in response to a touch manipulation with respect to either one of the screen information having the first and the second direction. Here, the control of the screen information may denote performing various functions associated with screen information such as scrolling screen information, switching screen information or the like.

Hereinafter, displaying the screen information having different display directions in the first region will be described in more detail with reference to the accompanying drawings.

As illustrated in FIG. 10A(a), a mobile terminal according to the present disclosure may include a display unit 251 having a first region 261 and a second region 262, 263. Here, as illustrated in FIG. 10A(a), an execution screen associated with an application being executed in the mobile terminal may be displayed in the first region 261. For example, the execution screen may be screen information 1010 associated with map information. Here, the screen information 1010 as well as map information may have a first display direction.

Here, the controller 180 may sense a touch applied to the second region 262, 263. More specifically, when the second region is divided into a first sub-region 262 and a second sub-region 263, the controller may sense a touch applied to at least one of the first and the second sub-region 262, 263. For example, as illustrated in FIG. 10A(b), the controller 180 may sense a drag input applied to the first and the second sub-region 262, 263 at the same time.

When the sensed touch is a preset type of touch, the controller 180 may display information having a second display direction which is different from the first display direction in at least part of the first region. For example, as illustrated in FIG. 10A(c), the controller 180 may display screen information in the form of being displayed when information displayed in the first display direction has a second display direction which is different from the first display direction in at least part of the first region. More specifically, when screen information having the first display direction is screen information on which map information is displayed in a horizontal direction based on the front surface of the display unit 251, screen information having the second display direction may be screen information 1020 on which the map information is displayed in a vertical direction based on the front surface of the display unit 251.

Through this, the user may receive screen information having various display directions with no posture change or additional manipulation of the mobile terminal body.

Figure 10B:
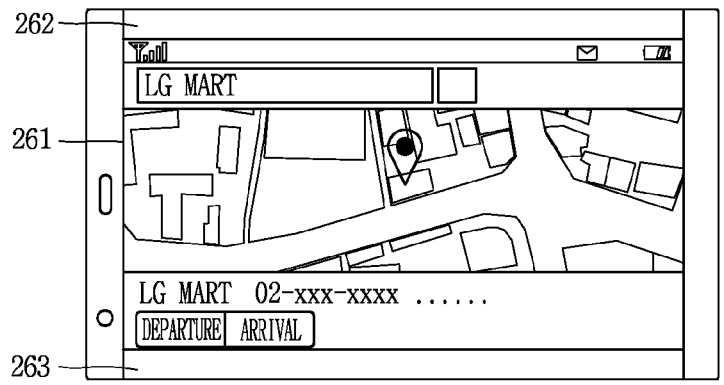
Figure 10B:
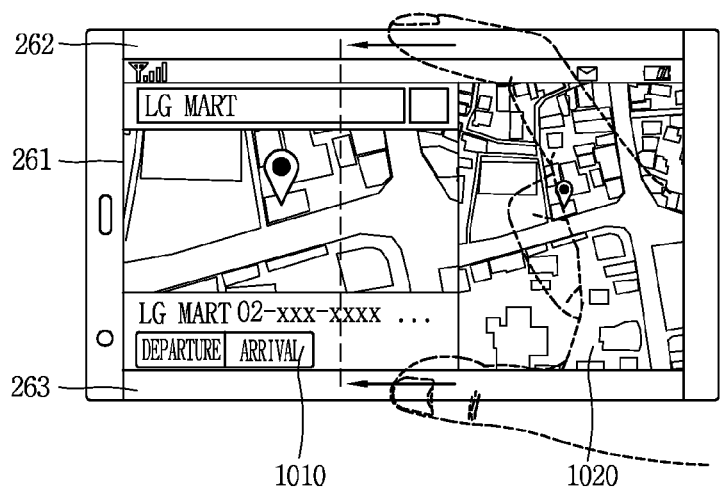
Figure 10B:
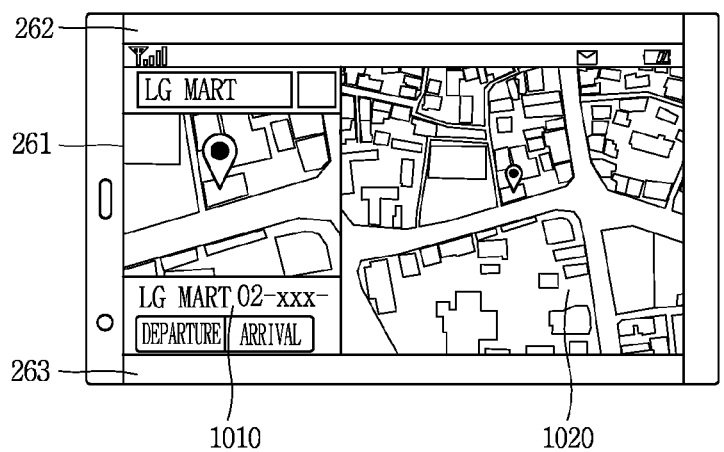

On the other hand, the controller 180 may determine a region displayed with screen information having the second display direction based on a region in which a preset touch is sensed. For example, as illustrated in FIG. 10B(b), the controller 180 may sense a drag input in the second region 262, 263. Here, the controller 180 may determine a region in which screen information having the second display direction is displayed based on a length over which the drag input is sensed in the second region 262, 263 within the first region 261.

For example, as illustrated in FIG. 10B(c), the controller 180 may display screen information having the second display direction in a region having a length corresponding to a length over which the drag input is sensed in the second region 262, 263 within the first region 261.

Through this, the user may adjust the length of a drag input applied to the second region to determine the size of a region in which screen information having a different display direction is to be displayed.

Furthermore, the controller 180 may display screen information 1020 having the second display direction in a region corresponding to a region to which a drag input is applied. More specifically, the controller 180 may detect the start position and end position of a drag input applied to the second region 262, 263. For example, as illustrated in FIG. 10C(b), the controller 180 may detect a region from a position corresponding to the start position of the drag input to a position corresponding to the end position thereof within the first region.

Figure 10C:
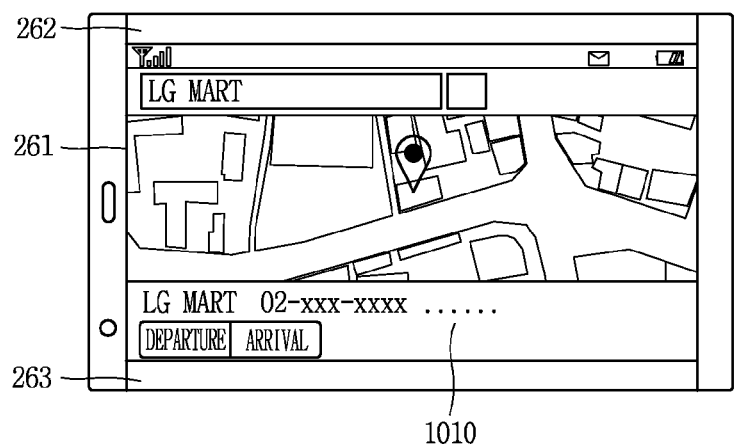
Figure 10C:
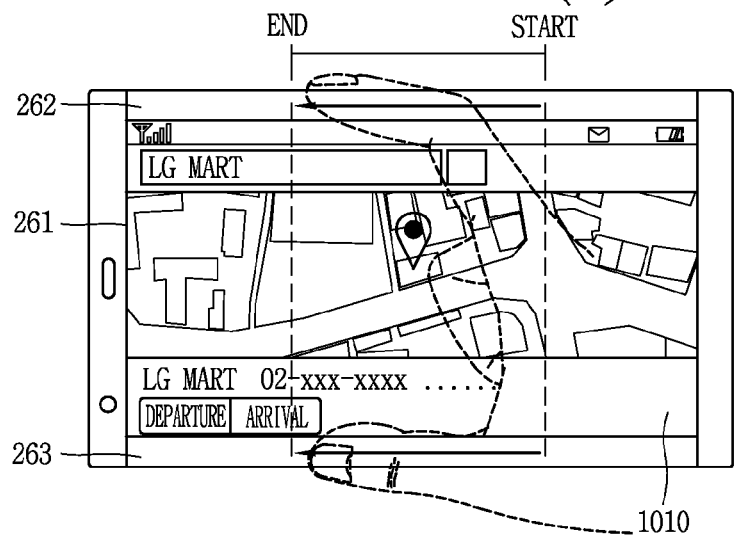
Figure 10C:
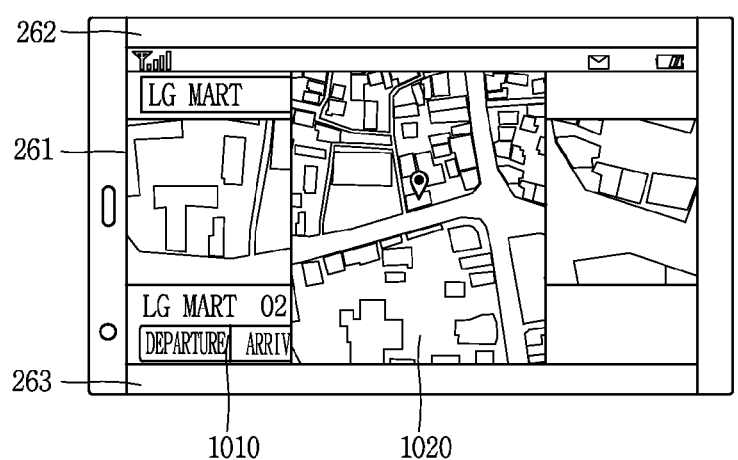

Here, as illustrated in FIG. 10C(c), the controller 180 may display screen information 1020 having the second display direction in the detected region.

Through this, the user may determine a region in which screen information having the second display direction is to be displayed.

Furthermore, the controller 180 may no longer display screen information having the second display direction in response to a preset touch being sensed in a state that screen information having the first and the second display direction are displayed at the same time in the first region 261.

Figure 10D:
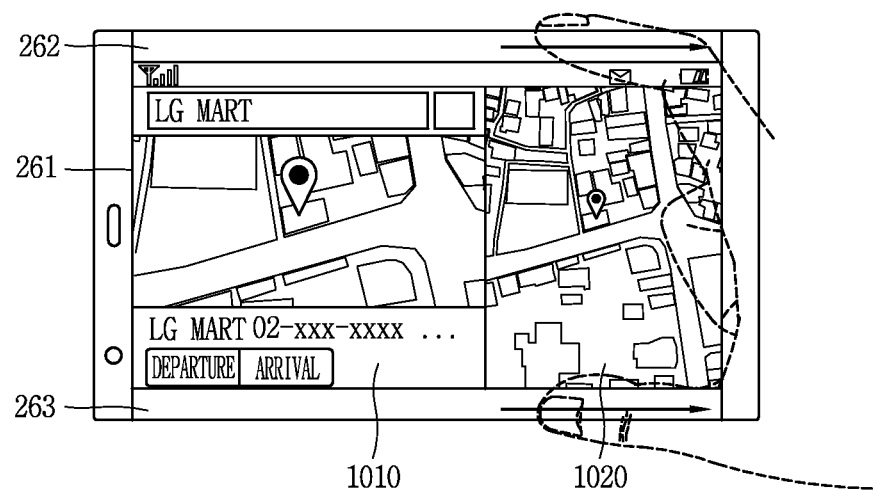
Figure 10D:
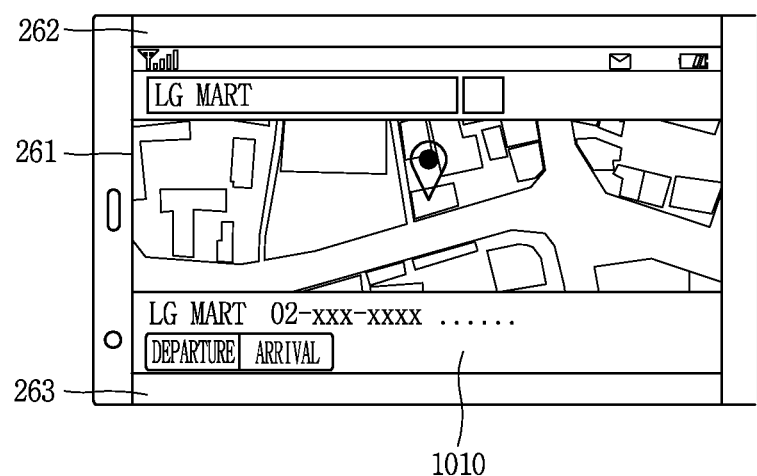

For example, as illustrated in FIG. 10D(a), when a drag input is sensed in a preset direction, the controller 180 may allow screen information 1020 having the second display direction to disappear from the first region. Here, only the screen information 1010 having the first display direction may be displayed in the first region 261.

In the above, a method of displaying screen information having a first and a second display direction at the same time has been described. Through this, the user may view screen information displayed in a plurality of directions with no additional manipulation such as a posture change of the display unit.

Figure 11A:
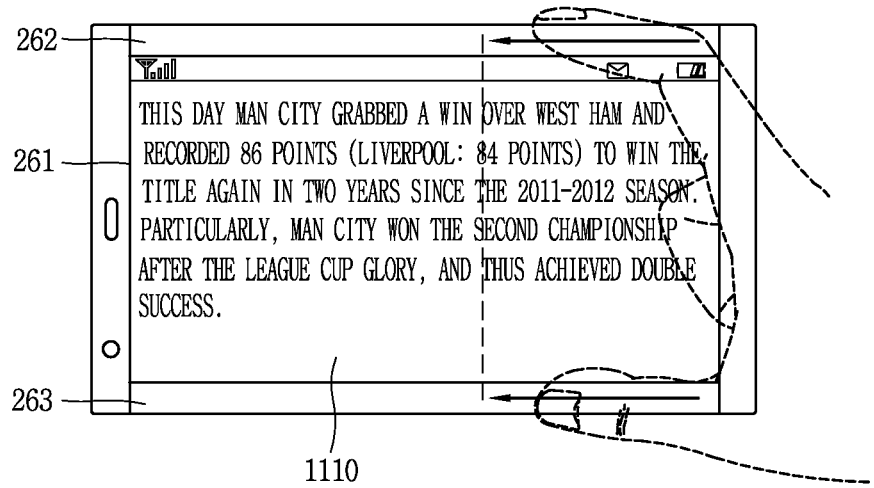
FIGS. 11A(a) to 11C(c) are conceptual views for explaining a relationship between screen information associated with each other.
Figure 11A:
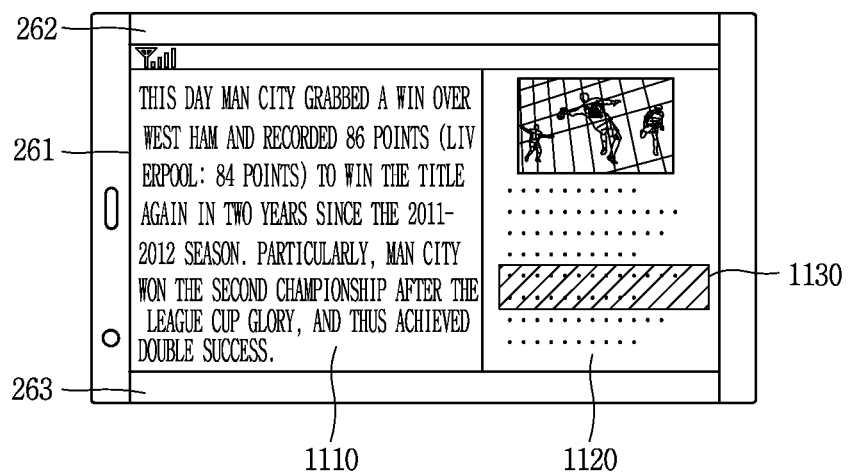

Hereinafter, a method of displaying a relationship between the screen information associated with each other when screen information having the first and the second display direction are screen information associated with each other will be described. FIGS. 11A(a) to 11C(c) are conceptual views for explaining a relationship between screen information associated with each other.

A mobile terminal according to the present disclosure may display screen information having a first and a second display direction at the same time. Here, the screen information having the first and the second display direction may be screen information associated with each other. For example, when the first screen information is a screen information indicating part of a document, the second screen information may be screen information indicating another part of the document containing the document content of the first screen information. In other words, the screen information having the first and the second display direction may be screen information on which part of the same document has a different display direction.

On the other hand, when screen information having the first and the second display direction are associated with each other, the controller 180 may visually display a relationship with the relevant screen information. More specifically, the controller 180 may display screen information having the first and the second display direction in such a manner that a region displayed with the same information is distinguished from another region.

For example, as illustrated in FIG. 11A(a), when a preset type of touch is sensed in the second region 262, 263 in a state that screen information 1110 having a first display direction is displayed, the controller 180 may display screen information 1120 having a second display direction which is different from the first display direction in at least part of the first region.

Here, the controller 180 may detect a region in which the same information is displayed in the screen information having the first display direction and screen information having the second display direction. For example, when screen information having the first display direction is information indicating part of a document, the controller 180 may detect a region displayed with the same information as information indicating the screen information having the first display direction in the screen information having the second display direction.

When a region displayed with the same information is detected, the controller 180 may display a region displayed with the same information to be visually distinguished from another region in at least one of the screen information having the first and the second display direction.

Here, the controller 180 may process either one of the screen information having the first and the second display direction in a visually distinguished manner, and process both the screen information having the first and the second display direction in a visually distinguished manner.

Furthermore, the controller 180 may select the screen information in a visually distinguished manner based on a preset condition. Here, the preset condition may be a condition containing a larger amount of screen information between the screen information having the first and the second display direction. In other words, containing a larger amount of screen information may denote that either one thereof contains all the screen information displayed in the other one thereof.

For example, as illustrated in FIG. 11A(b), in a state that the screen information 1120 having the second display direction is overlapped with the screen information 1110 having the first display direction, the controller 180 may process a region 1130 displayed with the same information as the screen information 1110 having the first display direction within the screen information 1120 having the second display direction in a highlighted manner. The highlight processing may be expressed using the contrast, color, graphic object or the like of the region.

Figure 11B:
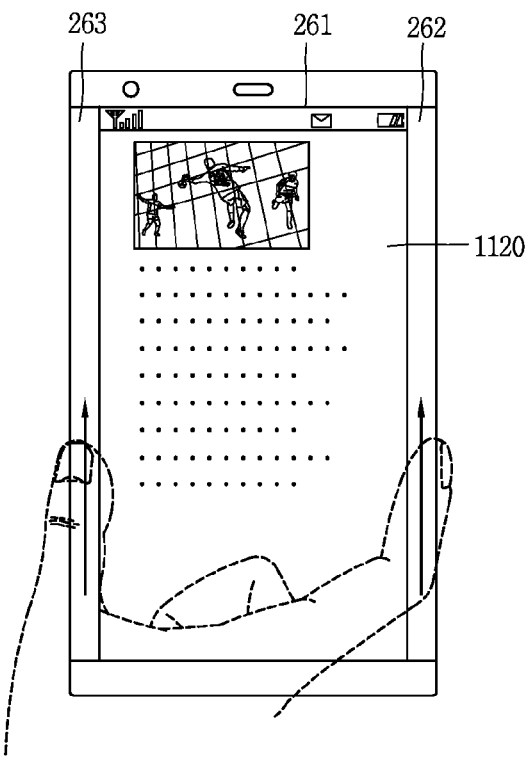
Figure 11B:
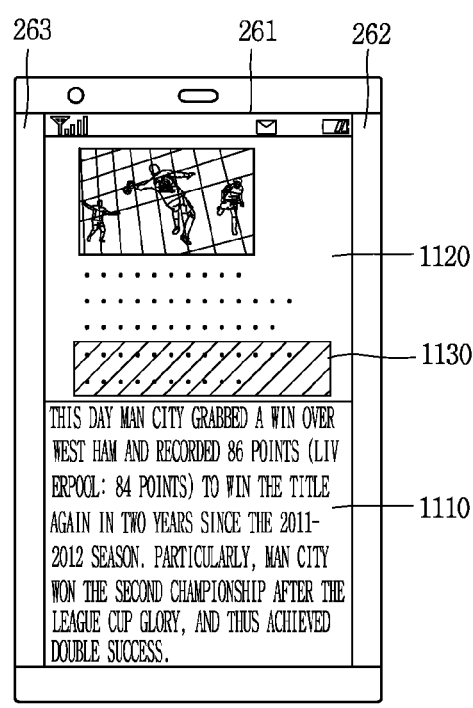

Furthermore, the controller 180 may process a region displayed with the same information as the screen information having the second display direction within the screen information having the first display direction in a highlighted manner. For example, as illustrated in FIG. 11B(b), when screen information having a first display direction is displayed on screen information having a second display direction, the controller 180 may process a region 1130 displayed with the same information within the screen information 1120 having the second display direction in a highlighted manner.

In other words, the controller 180 may detect screen information having a larger amount of screen information while containing a region displayed with the same information within screen information having a first and a second display direction, and process the region displayed with the same information within the detected screen information in a highlighted manner.

Figure 11C:
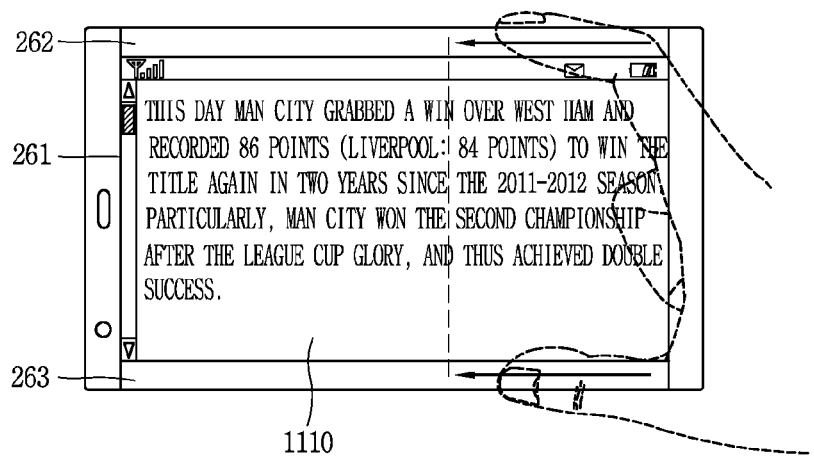
Figure 11C:
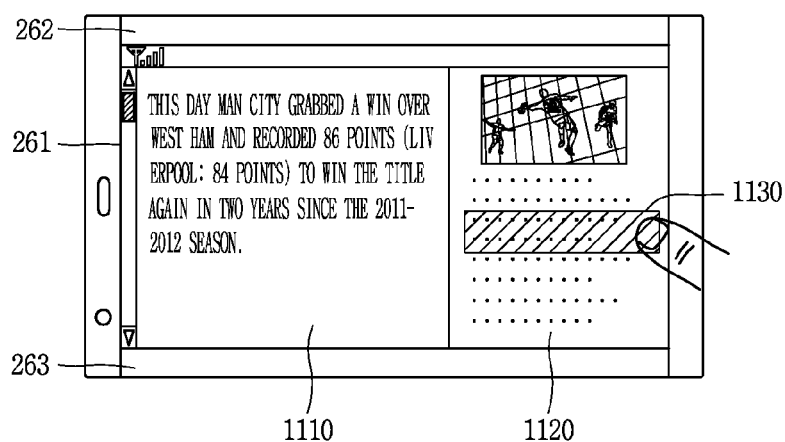
Figure 11C:
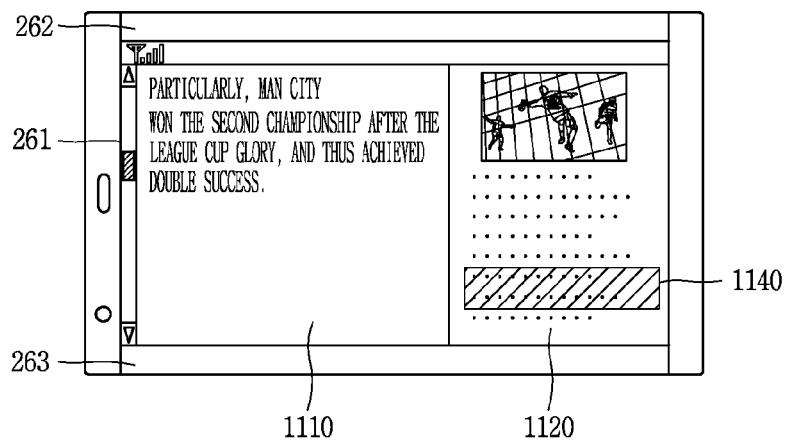

Furthermore, the controller 180 may control another one using a touch to either one of the screen information having the first and the second display region. For example, as illustrated in FIG. 11C(b), a region 1130 currently corresponding to the first display region may be processed in a highlighted manner in the second display region. Here, the controller 180 may sense a touch being applied to any one region within a region displayed with screen information 1120 having a second display direction.

When the touch is sensed, as illustrated in FIG. 11C(c), the controller 180 may scroll screen information having the first display direction such that information displayed in a region displayed with a position at which the touch is sensed is displayed on screen information having the first display direction. In this case, the region 1130 corresponding to a region in which the touch is sensed may be processed in a highlighted manner.

In the above, a method of controlling another one using a touch to either one of screen information having the first and the second display direction in a state that the screen information having the first and the second display direction is displayed in the first region has been described. Through this, the user may use screen information having a first and a second display direction in an organic manner.

Figure 12A:
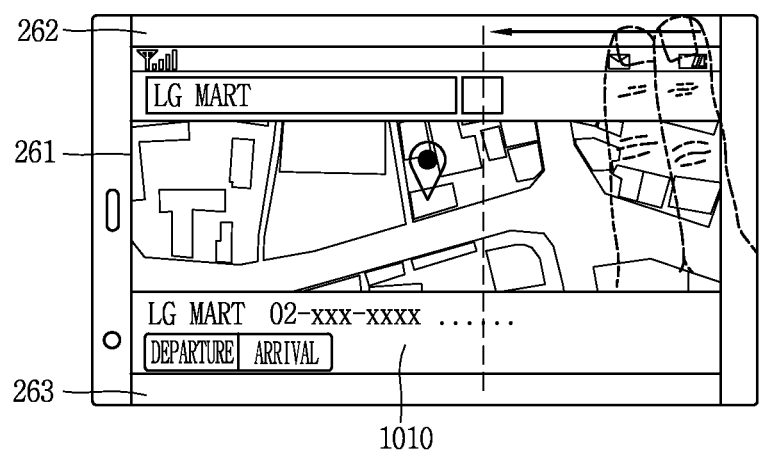
FIGS. 12A(a) to 12B(b) are conceptual views for explaining an embodiment of displaying screen information having a second display direction.
Figure 12A:
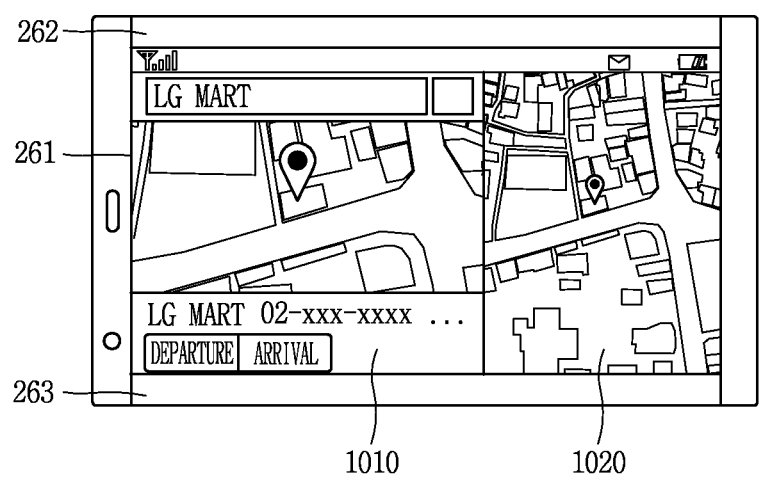

Hereinafter, a method of displaying screen information having a second display direction in a state screen information having a first display direction is displayed will be described. FIGS. 12A(a) to 12B(b) are conceptual views for explaining an embodiment of displaying screen information having a second display direction.

The controller 180 may display screen information having a display direction which is different from the display direction of the screen information displayed in the first region in at least part of screen information displayed in the first region based on a preset touch being applied thereto.

Here, the preset type of touch as a touch applied to the display unit 251 may be determined by at least one of a region in which the touch is applied, a time for which the touch is applied, a method with which the touch is applied, an area in which the touch is applied, and a length over which the touch is applied.

For example, the preset type of touch may be a drag input applied to the second region 262, 263 at the same time. Furthermore, the preset type of touch may be also determined by the direction of the drag input.

For another example, as illustrated in FIG. 12A(a), when the second region contains a first sub-region 262 and a second sub-region 263, the preset type of touch may be a touch sensed in a region having an area larger than a preset area applied to either one of the first and the second sub-region 262, 263.

Figure 12B:
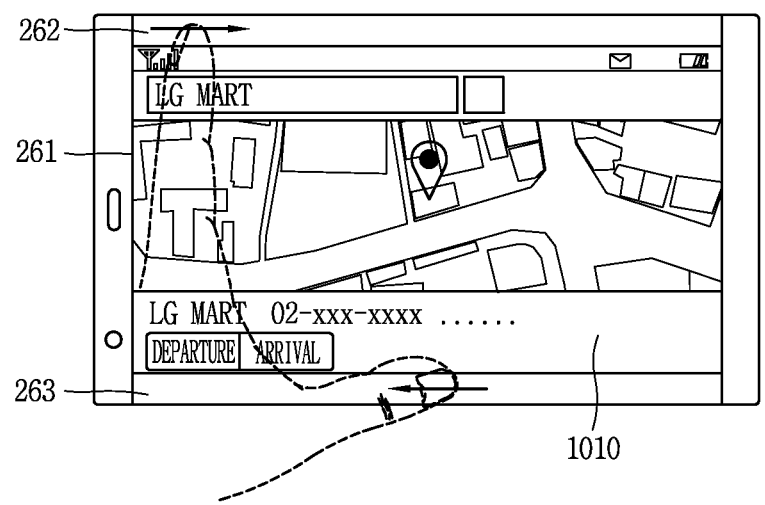
Figure 12B:
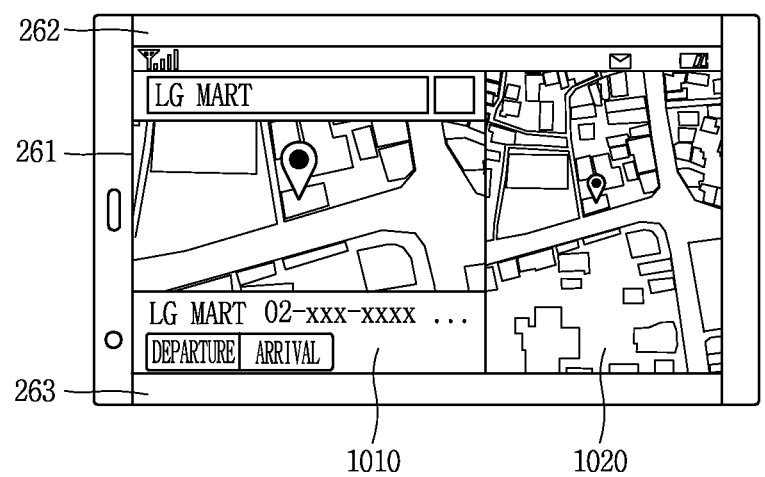

For still another example, as illustrated in FIG. 12B(a), the preset type of touch may be touches applied to the first and the second sub-region at the same time. Here, the directions of the touches applied to the first and the second sub-region may have the same or different directions. For example, as illustrated in FIG. 12B(a), touches applied to the first and the second sub-region may be applied in different directions.

As illustrated in FIGS. 12A(b) and 12B(b), when the preset type of touch is sensed, the controller 180 may display the screen information having different directions in at least part of the first region 261.

In the above example, screen information having different display directions have been displayed by a touch applied to the second region 262, 263. Through this, the user may view at least two screen information according to at least two directions at once with a simple manipulation. On the other hand, the present disclosure may not be necessarily limited to this, and may display screen information having different directions by various control commands. For example, various schemes may be used such as a preset type of touch applied to the first region, a button input, a voice input, and the like.

Figure 13A:
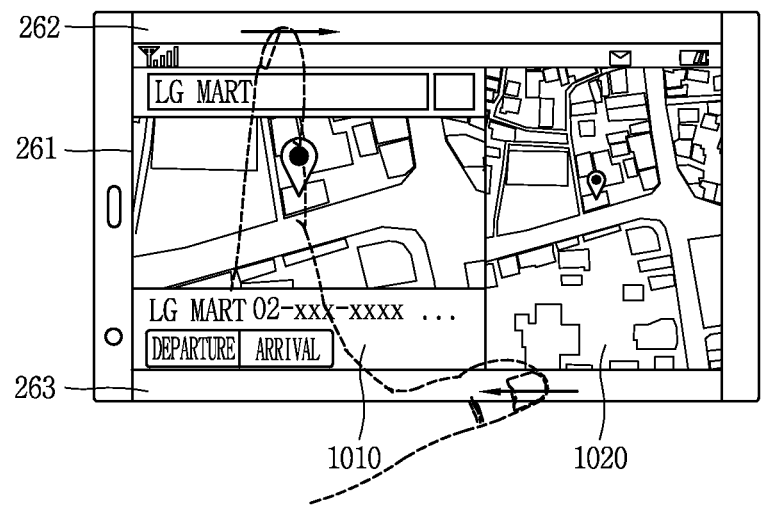
FIGS. 13A(a) to 13B(b) are conceptual views illustrating a method of determining at least one of at least some of the display locations of screen information having the first and the second display direction.
Figure 13A:
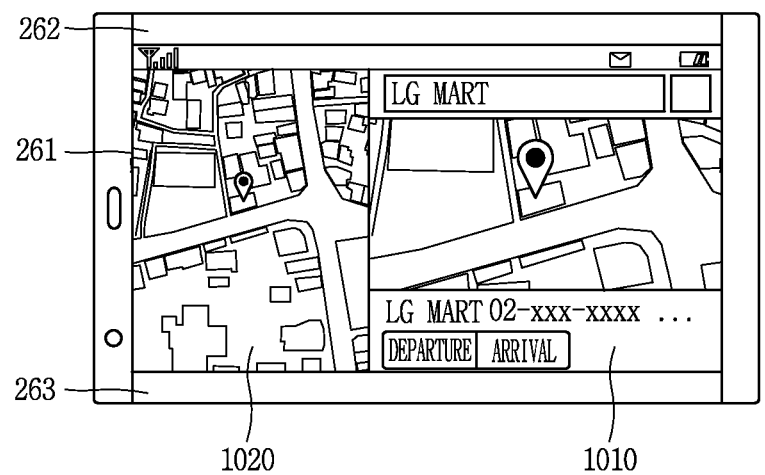

Hereinafter, a method of determining at least one of at least some of the display locations of the screen information having the first and the second display direction in a state that the screen information having the first and the second display direction is displayed in the first region. FIGS. 13A(a) to 13B(b) are conceptual views illustrating a method of determining at least one of at least some of the display locations of screen information having the first and the second display direction.

The controller 180 may change at least one of the display locations of the screen information having the first and the second display direction based on a preset type of touch applied to the second region 262, 263 in a state that the screen information having the first display direction and screen information having the second display direction are displayed in the first region at the same time.

For example, as illustrated in FIG. 13A(a), the controller 180 may sense touches applied to the second region 262, 263 at the same time in different directions. In this case, as illustrated in FIG. 13A(b), the controller 180 may change a location at which the screen information 1010 having the first display direction is displayed and a location at which the screen information 1020 having the second display direction is displayed in response to the touch. In other words, the user may view the display locations of the screen information 1010 having the first display direction and screen information 1020 having the second display direction, which are displayed in a changed manner.

Figure 13B:
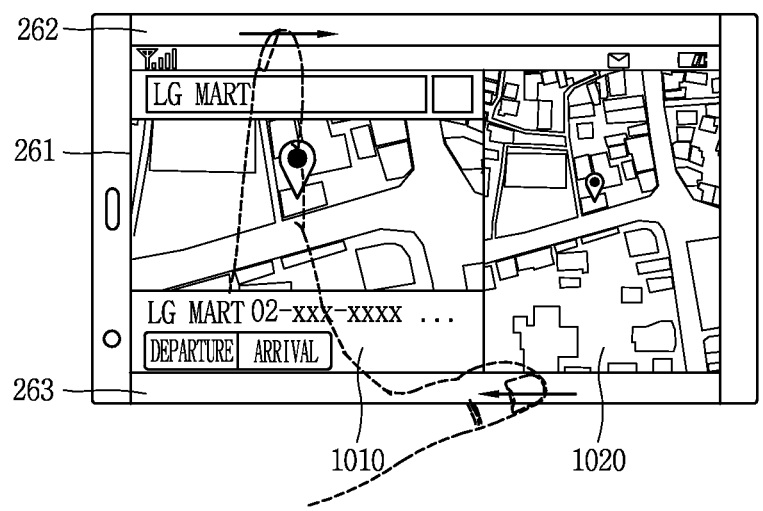
Figure 13B:
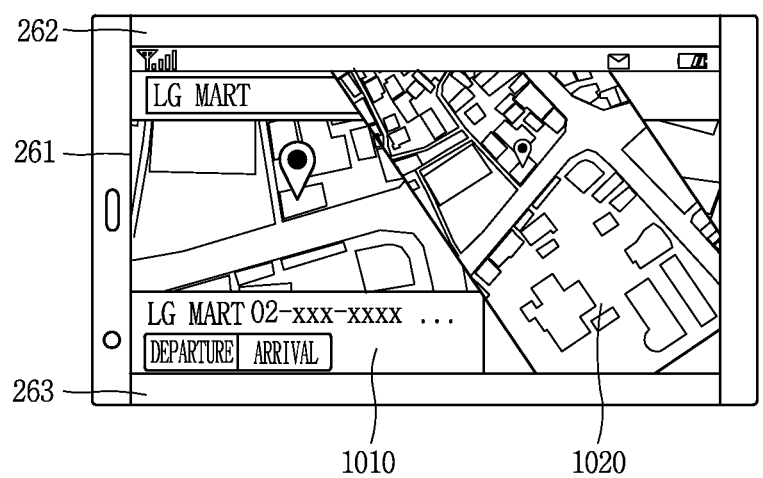

For another example, as illustrated in FIG. 13B(a), the controller 180 may change the display location of the screen information 1020 having the second display direction while not changing the display location of the screen information 1010 having the first display direction.

Here, as illustrated in FIG. 13B(b), the controller 180 may rotate and display the screen information 1020 having the second display direction according to the extent of drag inputs applied to the second region 262, 263 in different directions. In this case, the screen information 1020 having the second display direction may be displayed to be overlapped with the screen information 1010 having the first display direction.

In the above, a method of changing at least one of the display locations of the screen information having the first and the second display direction when a preset type of touch is applied to the second region in a state that the screen information having the first and the second display direction are displayed has been described. Through this, the user may receive screen information having different display directions at various display locations.

Figure 14A:
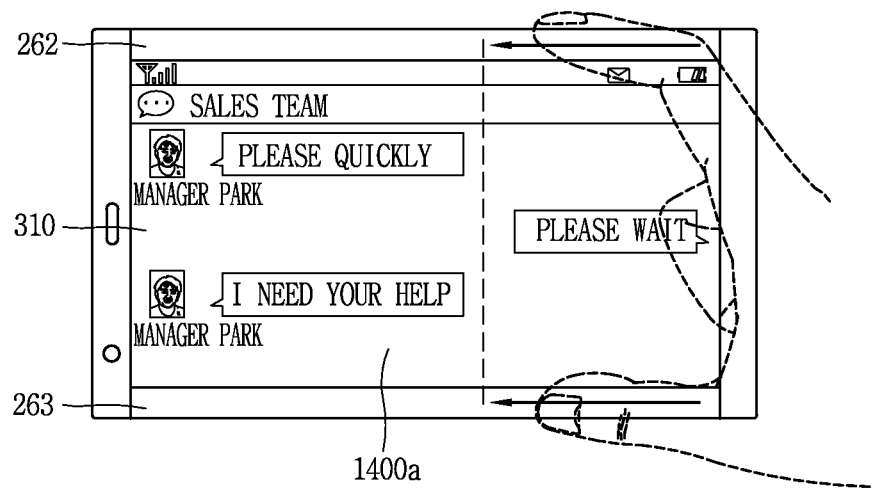
FIGS. 14A(a) to 14D(b) are conceptual views illustrating a type of screen information having a second display direction.
Figure 14A:
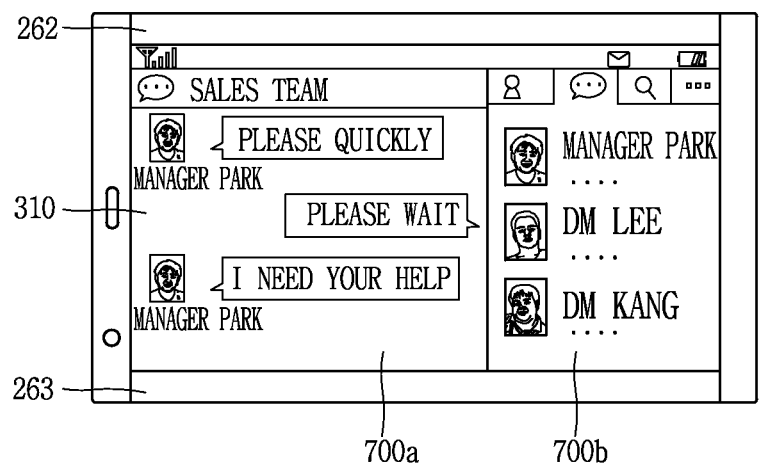

Hereinafter, when the screen information having the second display direction is displayed based on a preset type of touch being applied to the second region in a state that the screen information having the first display direction is displayed in the first region, the type of screen information having the second display direction will be described in more detail with reference to the accompanying drawings. FIGS. 14A(a) to 14D(b) are conceptual views illustrating a type of screen information having a second display direction.

When a preset type of touch is sensed in a state that screen information having a first display direction is displayed in the first region 261, the controller 180 may display screen information having a second display direction to be overlapped with at least part of the first region.

Here, the screen information having the second display direction may have been previously set or may be set by the user. More specifically, the screen information having the second display direction may previously correspond to the screen information having the first display direction, respectively. Furthermore, the user may directly set the screen information having the second display direction for each of the screen information having the first display direction.

The screen information having the second display direction may be screen information associated with the screen information having the first display direction. For example, as illustrated in FIG. 14A(a), the screen information having the first display direction may be screen information 1400a associated with the transmission and reception of messages. Here, as illustrated in FIG. 14A(b), the screen information having the second display direction may be screen information 1400b indicating an identification information list of external terminals capable of transmitting and receiving messages.

Figure 14B:
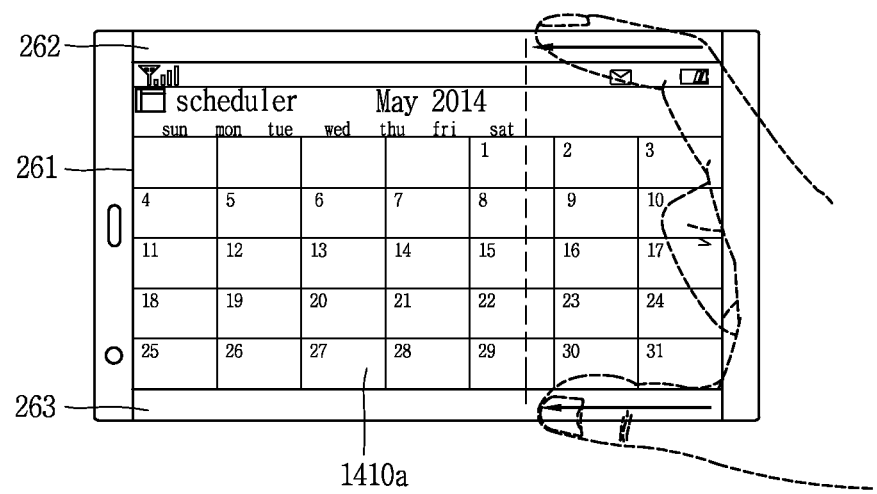
Figure 14B:
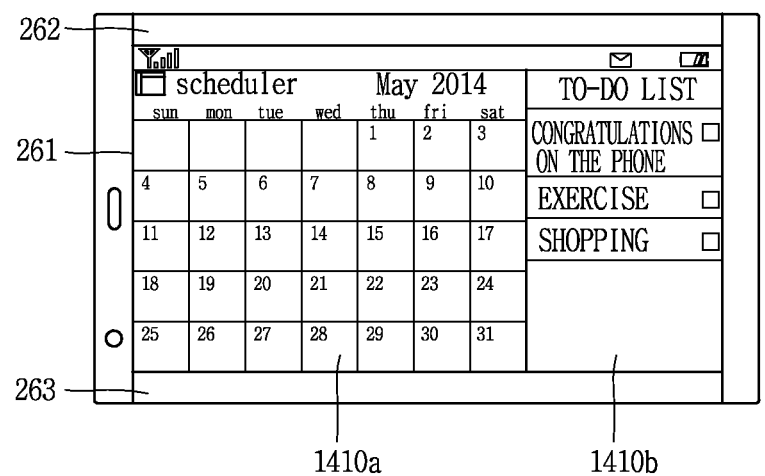

For another example, as illustrated in FIG. 14B(a), the screen information having the first display direction may be screen information 1410a associated with schedule management. Here, as illustrated in FIG. 14B(b), the screen information having the second display direction may be screen information 1410b screen information indicating a to-do list associated with the schedule.

Figure 14C:
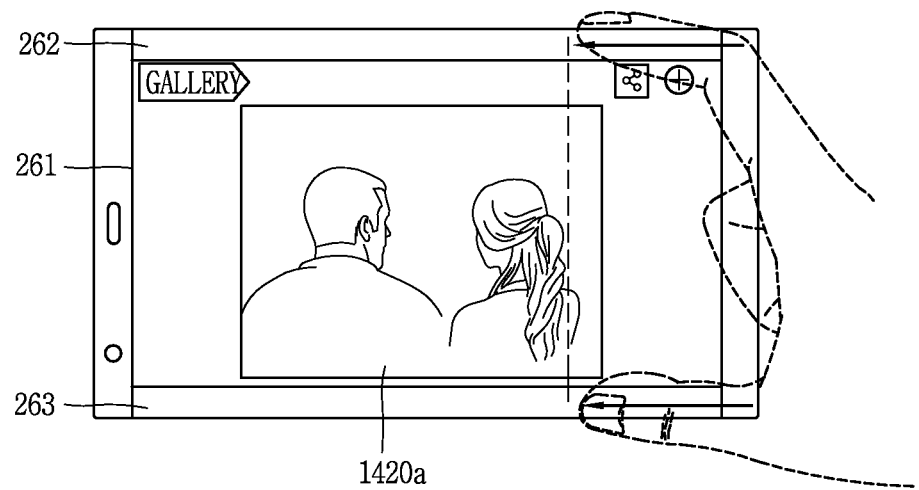
Figure 14C:
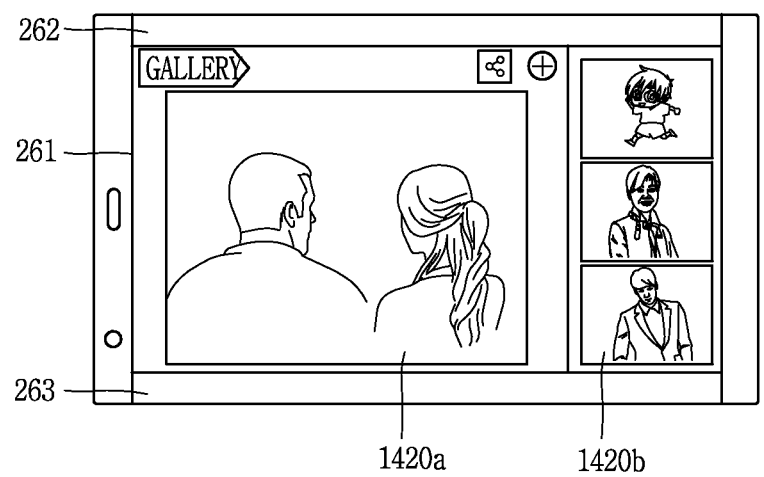

For still another example, as illustrated in FIG. 14C(a), the screen information having the first display direction may be any one image 1420a among a plurality of images stored in the memory unit 170 of the mobile terminal. Here, as illustrated in FIG. 14C(b), the screen information having the second display direction may be screen information 1420b indicating at least some of a plurality of images stored in the memory unit 170 of the mobile terminal.

Figure 14D:
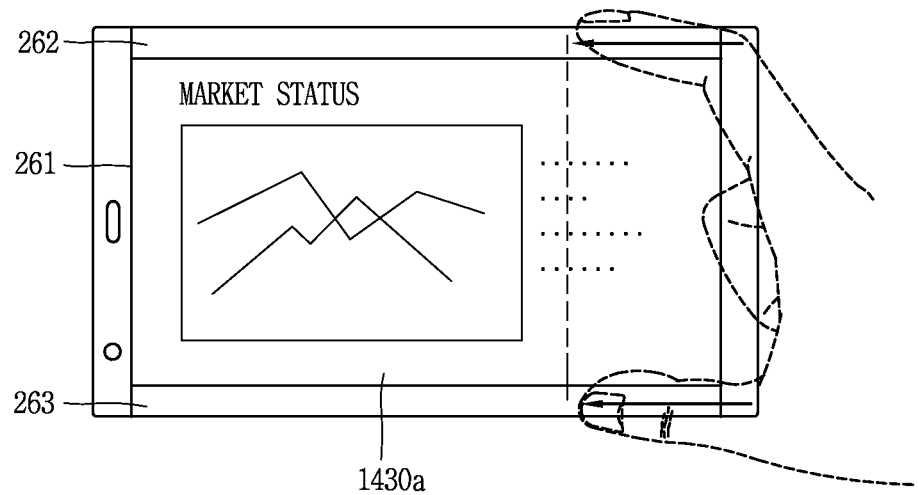
Figure 14D:
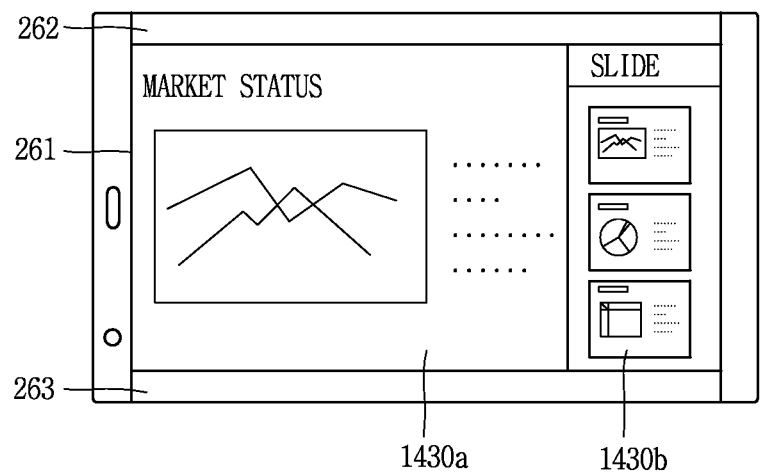

For yet still another example, as illustrated in FIG. 14D(a), the screen information having the first display direction may be any one slide 1430a among PPT slides. Here, as illustrated in FIG. 14D(b), the screen information having the second display direction may be screen information 1430b indicating the PPT list.

In other words, the screen information having the second display direction as information associated with the screen information having the first display direction may be screen information providing the user that being displayed in a second display direction is more convenient than being displayed in a first display direction.

In the above, the type of screen information having the second display direction when the screen information having the first and the second display direction are displayed at the same time has been described.

Figure 15A:
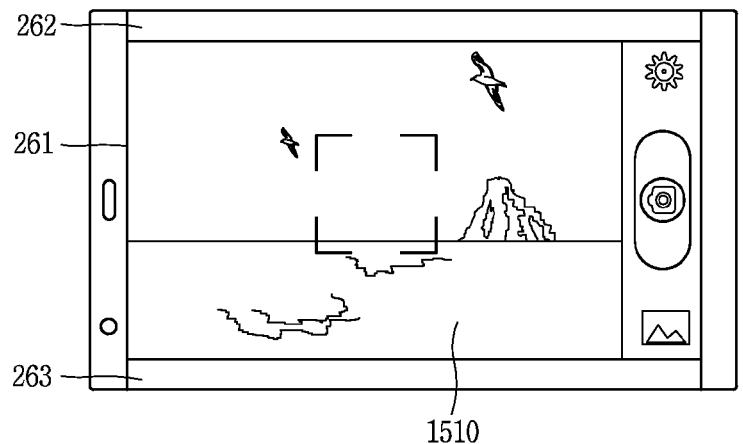
FIGS. 15A(a) to 15B(c) are conceptual views illustrating a method of displaying images received from cameras having different capture directions.
Figure 15A:
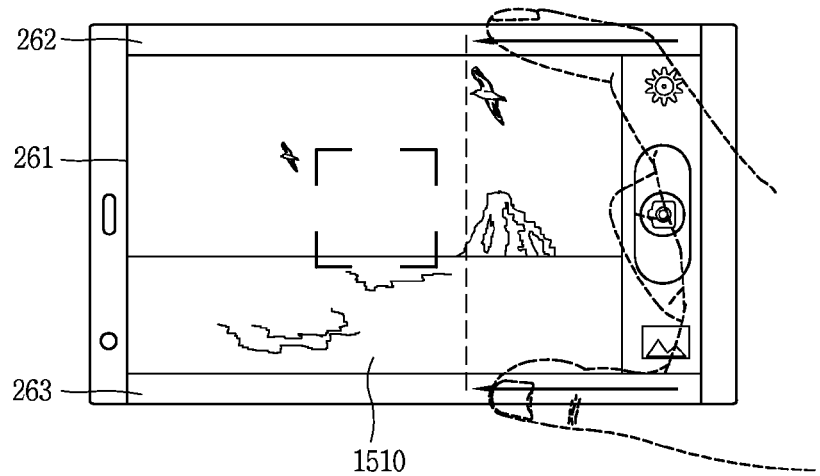
Figure 15A:
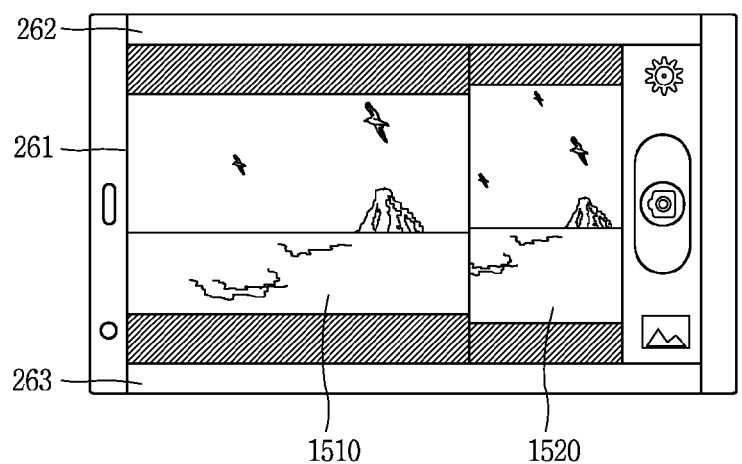

Hereinafter, a method of displaying images received from cameras different capture directions in a mobile terminal having the cameras having different capture directions will be described. FIGS. 15A(a) to 15B(c) are conceptual views illustrating a method of displaying images received from cameras having different capture directions.

A mobile terminal according to the present disclosure may further include a camera unit 121. Here, the camera unit 121 may be configured to change its capture direction. Furthermore, the present disclosure may include at least two camera units 121a, 121b having different capture directions. Hereinafter, the term of camera unit 121 may be used as a term including all of at least two camera units 121a, 121b having different capture directions.

The controller 180 may display an image 1510 received from the camera unit 121a. Here, when a preset type of touch is received, the controller 180 may activate the camera unit 121b in which the received image 1510 has a different capture direction from the capture direction. Furthermore, the controller 180 may display an image 1520 received from the camera unit 121b having the different capture direction to be overlapped with at least part of the received image 1510.

For example, as illustrated in FIGS. 15A(a) through 15A(c), when a preset type of touch is applied, the controller 180 may display images received from the camera units 121a, 121b having different capture direction at the same time. Here, a preset type of touch may be a touch applied to the second region 262, 263. At this time, though the camera units 121a, 121b having different capture directions can be used, the present disclosure may be configured to receive images captured by the rotation of the camera unit 121.

Figure 15B:
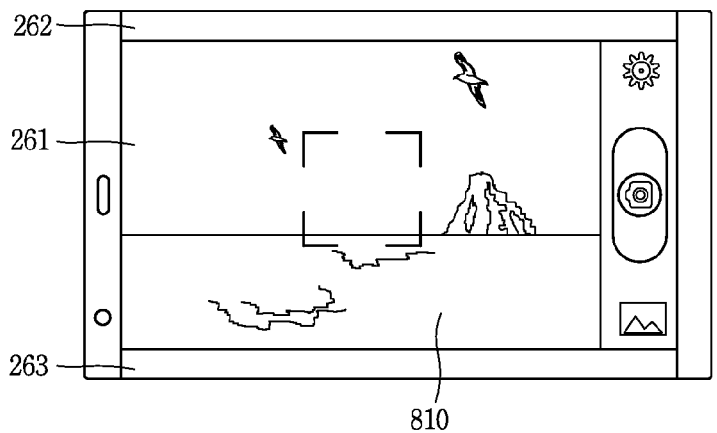
Figure 15B:
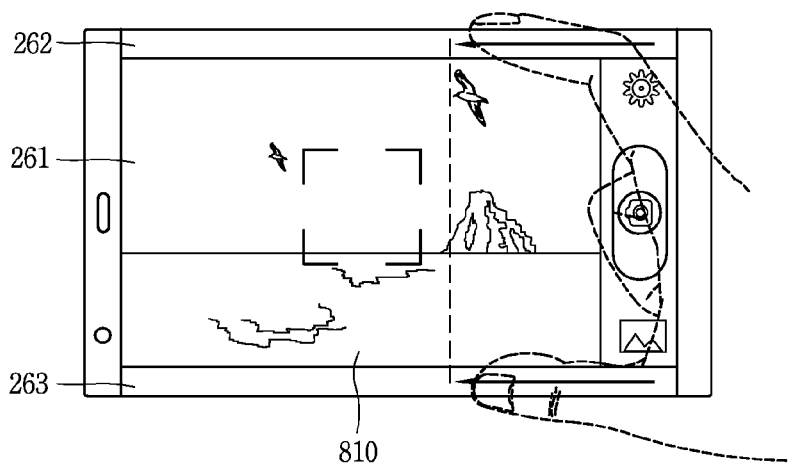
Figure 15B:
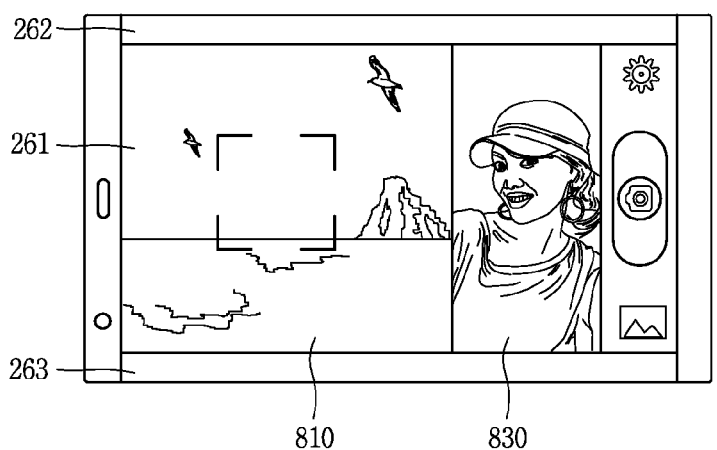

For another example, as illustrated in FIGS. 15B(a) to 15B(c), the controller 180 may display an image 810 received through either one camera unit 121a between the camera units 121a, 121b having opposite capture directions to each other. At this time, when a preset type of touch is sensed, the controller 180 may display images received from the any one camera unit 121a and the other camera unit 121b in at least part 1530 of the displayed image 1510.

On the other hand, an image received from the camera unit 121b having the different capture direction may be applicable to all the foregoing embodiments of screen information having a second display direction.

In the above, a method of displaying images received from camera units having different capture directions has been described. Through this, the user can activate the camera units using only touch manipulation. Furthermore, the user can compare images captured in various capture directions at once, thereby providing the convenience of capture.

Figure 16A:
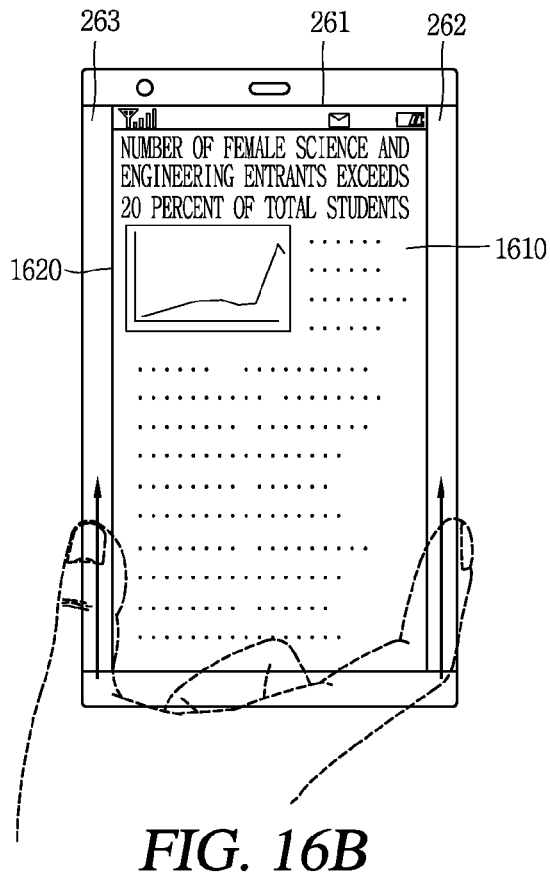
FIGS. 16A to 16B are a conceptual view illustrating that a specific region of the screen information having a first display direction is set to screen information having a second display direction.
Figure 16B:
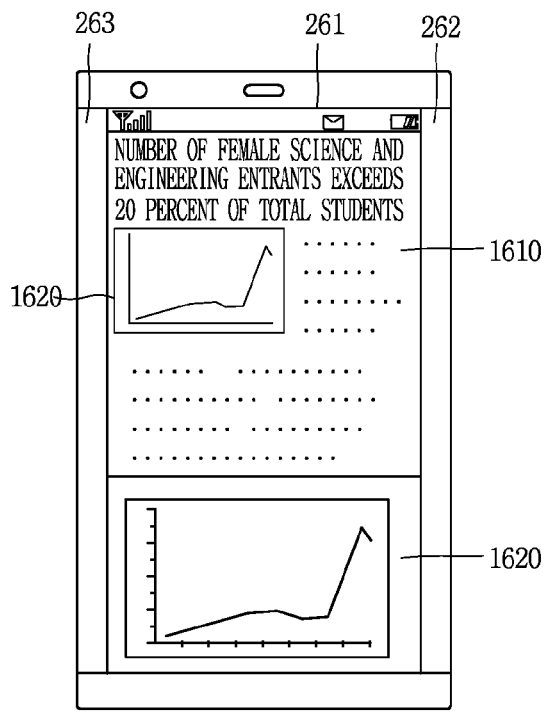

Hereinafter, a specific region of the screen information having a first display direction being set to screen information having a second display direction will be described. FIGS. 16A to 16B are a conceptual view illustrating that a specific region of the screen information having a first display direction is set to screen information having a second display direction.

When a preset type of touch applied to the second region 262, 263 is sensed in a state that screen information having a first display direction is displayed in the first region 261, the controller 180 may change at least some of the display directions of the screen information having the first display direction.

At this time, the screen information changed in the display direction may be displayed to be overlapped with the screen information having the first display direction.

On the other hand, the screen information changed in the display direction may be screen information determined that being displayed to have a second display direction among screen information having the first display direction is more convenient. For example, when the screen information having the first display direction is document information, the screen information having the second display direction may be an image contained in the document information.

For example, as illustrated in FIG. 16A, a drag input may be sensed in the second region 262, 263 in a state that document information 1610 is displayed in the first region 261. At this time, the controller 180 may determine the content of the document information 1610, and detect object information to be displayed in a second display direction which is different from the first display direction. For example, the object information may be an image 920. Then, as illustrated in FIG. 16B, the controller 180 may display the detected image 1620 in at least part of the document information 1610.

Through this, the user may view screen information on which the display direction is changed only in at least part thereof, thereby providing screen information with a higher readability.

According to the present disclosure, the direction of screen information displayed on the display unit may be implemented with only a simple manipulation, thereby providing images having various display directions to the user.

Furthermore, according to the present disclosure, the display direction of screen information displayed on the display unit may be changed through a manipulation to a lateral surface of the display unit, thereby providing a screen with a higher readability to the user.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
a body having a front side and a lateral side;
a display located on the front side and configured to display screen information;
a touch sensing unit formed on the lateral side and configured to receive a touch input;
a memory; and
a hardware controller operably coupled with the display, the touch sensing unit, and the memory, and capable of:
executing a first application, a second application, and a third application in sequential order, the sequential order stored in the memory;
causing the display to display second screen information related to the second application that is in an active state, wherein the first application and third application are in an inactive state, in which first screen information related to the first application and third screen information related to the third application are not displayed, while the second screen information is displayed;
receiving, via the touch sensing unit, a first touch input in a first or second direction while the second screen information is displayed and while the first application and the third application are in the inactive state, wherein the first screen information, the second screen information, and the third screen information are selectively displayed based on an input direction of the first touch input and the stored sequential order;
activating the first application to be in the active state and causing the display to display the first screen information in a first region of the display in response to the first touch input received in the first direction,
wherein the first application has been executed prior to the execution of the second application,
wherein a size of the first region of the display and a size of a partial portion of the first screen information that is displayed in the first region increase as the first touch input moves further in the first direction,
wherein a size of a second region of the display and a size of a partial portion of the second screen information displayed in the second region decrease as the sizes of the partial portion of the first screen information and the first region increase, and wherein the first screen information and the second screen information are scrolled in the first direction while the first touch input is received in the first direction such that more content of the first screen information is displayed in the first region and less content of the second screen information is displayed in the second region as the first touch input progresses;

displaying an entire portion of the first screen information on the display such that the second screen information is no longer displayed on the display when the first touch input is released from the touch sensing unit while a size of the first region, in which the first screen information is displayed, is greater than a size of the second region, in which the second screen information is displayed;

switching the second application to the inactive state when the second screen information is no longer displayed on the display;

displaying an entire portion of the second screen information on the display such that the first screen information is no longer displayed on the display when the first touch input is released from the touch sensing unit while a size of the second region, in which the second screen information is displayed, is greater than a size of the first region, in which the first screen information is displayed;

switching the first application to the inactive state when the first screen information is no longer displayed on the display;

activating the third application to be in the active state and causing the display to display the third screen information in the second region and to display the second screen information in the first region in response to the first touch input received in the second direction that is different from the first direction, wherein the third application has been executed subsequent to the execution of the second application; and displaying fourth screen information related to the third application in the second region in response to a second touch input received via the third screen information displayed in the second region such that the third screen information is replaced by the fourth screen information in the second region while the second screen information remains in the first region.

2. The mobile terminal of claim 1, wherein:
the touch sensing unit is located adjacent to both sides of the display;
the first touch input received in the first direction comprises touching a first point and sliding from the touched first point to a second point; and
the first touch input received in the second direction comprises touching a third point and sliding from the touched third point to a fourth point.

3. The mobile terminal of claim 1, wherein the controller causes the touch sensing unit to display a notification image at a location of the touch sensing unit to provide guidance for receiving the first touch input for displaying the first or second screen information.

4. The mobile terminal of claim 3, wherein:
the second screen information comprises a plurality of contents;

the first or third screen information is further information associated with one of the plurality of contents; and the location of the touch sensing unit where the notification image is displayed corresponds to a location of the display screen where the one of the plurality of contents is displayed.

5. The mobile terminal of claim 2, wherein the size of the first region and the size of the second region are changed in real time according to a touch range corresponding to a distance between the first point and the second point during the sliding of the first touch input received in the first direction such that only the first screen information, among the first, second, and third screen information, is displayed on the display when the second point corresponds to a lowermost end of the touch sensing unit.

6. The mobile terminal of claim 5, wherein the size of the first region increases and the size of the second region decreases as the distance increases.

7. The mobile terminal of claim 6, wherein the second region disappears from the display when the second point corresponds to the lowermost end of the touch sensing unit.

8. The mobile terminal of claim 7, wherein only the partial portion of the first screen information is displayed in the first region until the sliding reaches the second point corresponding to the lowermost end of the touch sensing unit.

9. The mobile terminal of claim 1, wherein the contents of the first screen information are displayed in a same size regardless of the size of the first region although more or less contents of the first screen information are displayed in the first region based on the size of the first region that is changed according to the progression of the first touch input.

10. The mobile terminal of claim 2, wherein the size of the first region and the size of the second region are changed in real time according to a touch range corresponding to a distance between the third point and the fourth point during the sliding of the first touch input received in the second direction such that only the third screen information is displayed on the display when the fourth point corresponds to an uppermost end of the touch sensing unit.

11. A method of controlling a mobile terminal comprising a display located on a front side of a body of the mobile terminal and a touch sensing unit formed on a lateral side of the body, the method comprising:

executing a first application, a second application, and a third application in sequential order, the sequential order stored in a memory;

displaying, on the display, second screen information related to the second application that is in an active state, wherein the first application and third application are in an inactive state, in which first screen information related to the first application and third screen information related to the third application are not displayed, while the second screen information is displayed;

receiving, via the touch sensing unit, a first touch input in a first or second direction while the second screen information is displayed and while the first application and the third application are in the inactive state, wherein the first screen information, the second screen information, and the third screen information are selectively displayed based on an input direction of the first touch input and the stored sequential order;

activating the first application to be in the active state and displaying, on the display, the first screen information in a first region of the display in response to the first touch input received in the first direction, wherein the first application has been executed prior to the execution of the second application, wherein a size of the first region of the display and a size of a partial portion of the first screen information that is displayed in the first region increase as the first touch input moves further in the first direction, wherein a size of a second region of the display and a size of a partial portion of the second screen information displayed in the second region decrease as the sizes of the partial portion of the first screen information and the first region increase, and wherein the first screen information and the second screen information are scrolled in the first direction while the first touch input is received in the first direction such that more content of the first screen information is displayed in the first region and less content of the second screen information is displayed in the second region as the first touch input progresses;

displaying an entire portion of the first screen information on the display such that the second screen information is no longer displayed on the display when the first touch input is released from the touch sensing unit while a size of the first region, in which the first screen information is displayed, is greater than a size of the second region, in which the second screen information is displayed;

switching the second application to the inactive state when the second screen information is no longer displayed on the display;

displaying an entire portion of the second screen information on the display such that the first screen information is no longer displayed on the display when the first touch input is released from the touch sensing unit while a size of the second region, in which the second screen information is displayed, is greater than a size of the first region, in which the first screen information is displayed;

switching the first application to the inactive state when the first screen information is no longer displayed on the display;

activating the third application to be in the active state and displaying, on the display, the third screen information in the second region and displaying the second screen information in the first region in response to the touch input received in the second direction that is different from the first direction, wherein the third application has been executed subsequent to the execution of the second application; and displaying fourth screen information related to the third application in the second region in response to a second touch input received via the third screen information displayed in the second region such that the third screen information is replaced by the fourth screen information in the second region while the second screen information remains in the first region.

* * * * *